United States Patent
Glaser et al.

(10) Patent No.: US 12,461,355 B2
(45) Date of Patent: *Nov. 4, 2025

(54) OPEN-TOP LIGHT-SHEET MICROSCOPY WITH A NON-ORTHOGONAL ARRANGEMENT OF ILLUMINATION AND COLLECTION OBJECTIVES

(71) Applicant: University of Washington, Seattle, WA (US)

(72) Inventors: Adam K. Glaser, Seattle, WA (US); Jonathan T. C. Liu, Seattle, WA (US)

(73) Assignee: University of Washington, Seattle, WA (US)

( * ) Notice: Subject to any disclaimer, the term of this patent is extended or adjusted under 35 U.S.C. 154(b) by 167 days.

This patent is subject to a terminal disclaimer.

(21) Appl. No.: 18/189,018

(22) Filed: Mar. 23, 2023

(65) Prior Publication Data

US 2023/0341669 A1      Oct. 26, 2023

Related U.S. Application Data

(63) Continuation of application No. 17/737,736, filed on May 5, 2022, now Pat. No. 11,644,656, and a (Continued)

(51) Int. Cl.
*G02B 21/06* (2006.01)
*G02B 21/02* (2006.01)
(Continued)

(52) U.S. Cl.
CPC ............ *G02B 21/06* (2013.01); *G02B 21/02* (2013.01); *G02B 21/33* (2013.01); *G02B 21/361* (2013.01)

(58) Field of Classification Search
CPC .... G02B 21/008; G02B 21/002; G02B 21/02; G02B 21/06; G02B 21/082; G02B 21/26;
(Continued)

(56) References Cited

U.S. PATENT DOCUMENTS 11,506,877 B2    11/2022 Tomer
2007/0121107 A1   5/2007 Tsai et al.
(Continued)

FOREIGN PATENT DOCUMENTS

WO    2012110488 A2    8/2012
WO    2016049368 A1    3/2016
(Continued)

OTHER PUBLICATIONS

International Search Report/Written Opinion dated Feb. 8, 2021 for PCT Application No. PCT/US2020/060530.
(Continued)

*Primary Examiner* — Mustak Choudhury
(74) *Attorney, Agent, or Firm* — Dorsey & Whitney LLP

(57) ABSTRACT

Apparatuses, systems, and methods for an open-top light-sheet (OTLS) microscope which includes an illumination objective and a collection objective which have optical axes which are non-orthogonal to each other. The optical axis of the collection objective may be orthogonal to a plane of the sample holder. The illumination and collection objective may be located below the sample holder. The OTLS microscope may optionally include a second collection objective which has an optical axis orthogonal to the optical axis of the illumination objective. The illumination objective may be an air objective, and the collection objective may be an immersion objective.

36 Claims, 11 Drawing Sheets

Related U.S. Application Data continuation of application No. PCT/US2020/060530, filed on Nov. 13, 2020.

(60) Provisional application No. 62/934,758, filed on Nov. 13, 2019.

(51) Int. Cl.
*G02B 21/33* (2006.01)
*G02B 21/36* (2006.01)

(58) Field of Classification Search
CPC ...... G02B 21/33; G02B 21/34; G02B 21/361; G02B 11/06; G02B 11/0625; G01N 21/41; G01N 21/55
See application file for complete search history.

(56) References Cited

U.S. PATENT DOCUMENTS

| | | |
|---|---|---|
| 2011/0122488 A1 | 5/2011 | Truong et al. |
| 2012/0049087 A1 | 3/2012 | Choi et al. |
| 2014/0126046 A1 | 5/2014 | Shroff et al. |
| 2019/0064493 A1* | 2/2019 | Truong ............... G06V 10/60 |
| 2019/0196172 A1 | 6/2019 | Hillman |
| 2019/0310451 A1 | 10/2019 | Tomer |
| 2019/0391378 A1* | 12/2019 | Eichelkraut ............ G02B 21/36 |
| 2020/0012084 A1* | 1/2020 | Siebenmorgen ....... G02B 21/06 |
| 2022/0260821 A1 | 8/2022 | Glaser et al. |

FOREIGN PATENT DOCUMENTS

| | | |
|---|---|---|
| WO | 2019148008 A1 | 8/2019 |
| WO | 2021097300 A1 | 5/2021 |

OTHER PUBLICATIONS

U.S. Continuation U.S. Appl. No. 17/737,736 titled "Open-Top Light-Sheet Microscopy With a Non-Orthogonal Arrangement of Illumination and Collection Objectives" filed May 5, 2022.

U.S. Appl. No. 62/934,758 titled "Open-Top Light-Sheet Microscopy With a Non-Orthogonal Arrangement of Illumination and Collection Objectives" filed Nov. 13, 2019.

Dunsby, "Optically sectioned imaging by oblique plane microscopy", Optics Express vol. 16, Issue 25. https://doi.org/10.1364/OE.16.020306, Dec. 8, 2008, pp. 20306-20316.

Yang, et al., "High Numerical Aperture Epi-illumination Selective Plane Illumination Microscopy", bioRxiv. https://www.biorxiv.org/content/10.1101/273359v1, Feb. 28, 2018, pp. 6-7.

\* cited by examiner

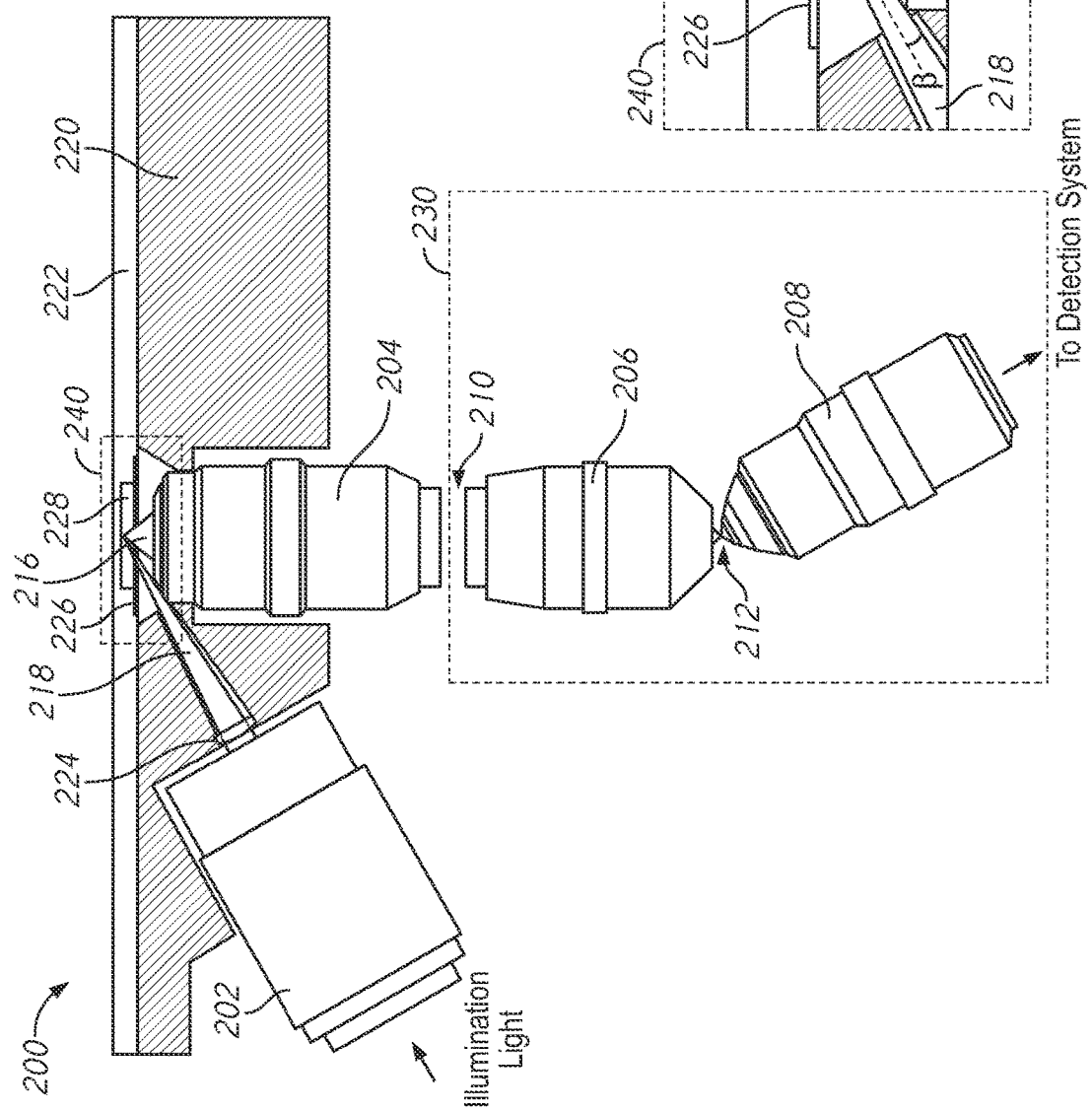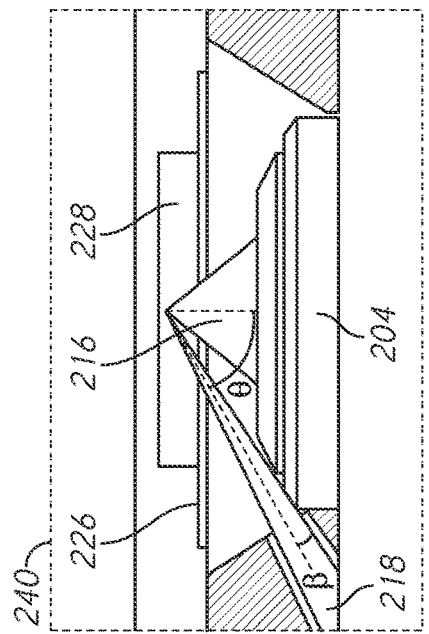
FIG. 2A
FIG. 2B

OPEN-TOP LIGHT-SHEET MICROSCOPY WITH A NON-ORTHOGONAL ARRANGEMENT OF ILLUMINATION AND COLLECTION OBJECTIVES

CROSS-REFERENCE TO RELATED APPLICATION(S)

This application is a continuation U.S. application Ser. No. 17/737,736, filed May 5, 2022, which is a continuation of International Patent Application No. PCT/US2020/060530, filed Nov. 13, 2020, which claims the benefit under 35 § U.S.C. 119 of the earlier filing date of U.S. Provisional Application Ser. No. 62/934,758 filed Nov. 13, 2019, the entire contents of which is hereby incorporated by reference, in its entirety, for any purpose.

STATEMENT REGARDING RESEARCH & DEVELOPMENT

This invention was made with government support under Grant No. K99 CA240681, awarded by the National Institutes of Health, and Grant No. W81XWH-18-10358, awarded by the Department of Defense. The government has certain rights in the invention.

BACKGROUND

Microscopy may generally involve directing light onto a sample, and then imaging the sample based on light received from the sample. One method of illumination is to use a light sheet, where a relatively thin plane of the sample is illuminated. This may have advantages in terms of both the optical properties of the tissue (e.g., reduced photobleaching and phototoxicity) and also increased throughput for imaging large volumes of a sample. Open-top light-sheet (OTLS) microscope configurations, which resemble a flat-bed document scanner for tissues, have been developed to allow for convenient imaging of one or more tissue specimens without lateral constraints. OTLS microscope geometries may introduce various limitations to the resolution of the image, the depth of imaging in the sample, and/or impose relatively strict index of refraction tolerances on the system. There may be a need to develop an OTLS microscope that addresses some of these trade-offs while maintaining the advantageous aspects of the open-top configuration.

SUMMARY

In at least one aspect, the present disclosure relates to an apparatus including an illumination objective and a collection objective. The illumination objective directs an illumination light sheet along an illumination axis into a sample. The collection objective receive light from an imaging plane of the sample along a collection axis. The illumination axis and the collection axis are non-orthogonal to each other.

The apparatus may also include a second collection objective which may receive light from the imaging plane of the sample along a second collection axis. The second collection axis may be approximately orthogonal to the illumination axis. The apparatus may also include illumination optics which may generate the illumination light sheet. The illumination optics may be adjustable between settings based on the collection objective and the second collection objective. The collection objective may have a first numerical aperture (NA) and the second collection objective may have a second NA which is lower than the first NA.

The apparatus may include a third objective lens and a fourth objective lens. The third objective lens may receive light from the collection objective and generate a remote image. The fourth objective lens may image the remote image at an angle based on the non-orthogonal angle between the illumination axis and the collection axis.

The apparatus may include an immersion fluid. The illumination objective may not be in contact with the immersion fluid while at least a portion of the collection objective may be in contact with the immersion fluid. The apparatus may include a sample holder configured to support the sample and at least a portion of the sample holder may be in contact with the immersion fluid. The apparatus may include a lens positioned between the illumination objective and the immersion fluid. The lens may be a solid immersion lens (SIL) a solid immersion meniscus lens (SIMlens).

The apparatus may include a sample holder having a first side configured to support the sample and a second side opposite the first side, wherein the illumination objective and the collection objective are positioned below the second side. The collection objective may have a depth of focus for a given field of view, and the illumination axis may be oriented so that it does not stay within the depth of focus of the collection objective.

In at least one aspect, the present disclosure relates to an apparatus including a sample holder, an illumination objective, and a collection objective. The sample holder includes a first surface and a second surface opposite the first surface. The first surface supports a sample. The illumination objective directs an illumination light sheet towards the sample at an angle which is non-orthogonal to the first surface of the sample holder. The collection objective collects light along a collection axis which is approximately orthogonal to the first surface.

The illumination objective and the collection objective may be positioned below the second surface. The apparatus may include a second collection objective which may collect light along a second collection axis which is approximately orthogonal to the illumination light sheet. The collection axis may form an acute angle with the illumination light sheet. The acute angle may be between about 40° and 70°.

The apparatus may also include an immersion chamber positioned between the illumination objective and the second surface of the sample holder. The immersion chamber may hold an immersion fluid, and the illumination light sheet may pass through the immersion fluid before reaching the sample. The apparatus may include a solid immersion lens (SIL), and the illumination objective may direct the illumination light sheet through the SIL and into the immersion fluid. The apparatus may include a solid immersion meniscus lens (SIMlens), and the illumination objective may direct the illumination light sheet through the SIMlens and into the immersion fluid. At least a portion of the collection objective may be positioned in the immersion fluid, and the illumination objective may not be in contact with the immersion fluid.

In at least one aspect, the present disclosure relates to an apparatus including a first, second, and third objective lens. The first objective lens directs an illumination sheet to a sample in a first operational mode and a second operational mode. The first objective lens has a first optical axis. The second objective lens receives light from the sample in the first operational mode. The second objective lens has a second optical axis which is non-orthogonal to the first optical axis. The third objective lens receives light from the sample in the second operational mode. The third objective lens having a third optical axis which is approximately orthogonal to the first optical axis.

The apparatus may include a sample holder which may have a first surface which supports the sample. The second optical axis may be approximately orthogonal to the first surface, and the first optical axis and the third optical axis may be non-orthogonal to the first surface. The sample holder may also include a second surface opposite the first surface, and the first objective, the second objective, and the third objective may be positioned below the second surface. The third objective lens may also provide an illumination sheet to the sample in a third operational mode. The second objective lens may also receive light from the sample in the third operational mode.

The apparatus may also include collection optics which may generate a remote image based on the light received by the second objective lens in the first operational mode or the third operational mode, a fourth objective lens which may collect light from the remote image at a first angle in the first operational mode, and a fifth objective lens which may collect light from the remote image at a second angle in the third operational mode. The apparatus may include a controller which may combine images of the sample from the first operational mode and the third operational mode to generate an enhanced image of the sample.

The apparatus may include illumination optics which may generate the illumination sheet and provide it to the first objective lens. The illumination optics may generate the illumination light sheet in a first configuration in the first operational mode, and may generate the illumination light sheet in a second configuration in the second operational mode. The first configuration may have a first numerical aperture and a first width, and the second configuration may have a second numerical aperture which is smaller than the first numerical aperture and a second width which is larger than the first width.

In at least one aspect, the present disclosure relates to a method which includes directing an illumination light sheet through an illumination objective to a focal region of a sample, collecting light from the focal region through a collection objective, where an optical axis of the collection objective is non-orthogonal to an optical axis of the illumination objective, and imaging the collected light.

The method may also include collecting light from the focal region through a second collection objective, where an optical axis of the second collection objective is approximately orthogonal to the optical axis of the illumination objective, and imaging the collected light from the second collection objective. Collecting the light through the collection objective may be part of a first operational mode and collecting the light through the second collection objective may be part of a second operational mode. The method may include adjusting one or more properties of the illumination light sheet between the first operational mode and the second operational mode.

The method may also include generating a remote image based on the collected light, and imaging the remote image at an angle based on the non-orthogonal angle between the optical axis of the collection objective and the optical axis of the illumination objective. The quality of the image collected by the collection objective may be diffraction limited, with a Strehl ratio greater than approximately 0.8. The method may also include passing the illumination light sheet from the illumination light sheet through an ambient medium, through an immersion fluid and through a material of a sample holder to the focal region of the sample, and collecting light through the material of the sample holder and through the immersion fluid to the collection objective.

In at least one aspect, the present disclosure relates to a system including an open top light sheet (OTLS) microscope and a controller which operates the OTLS microscope. The OTSL microscope includes an illumination objective which directs an illumination light sheet along an illumination axis into a sample, a first collection objective, and a second collection objective. The first collection objective receives light from an imaging plane of the sample along a first collection axis. The illumination axis and the first collection axis are non-orthogonal to each other. The second collection objective receives light from an imaging plane of the sample along a second collection axis. The illumination axis and the second collection axis are orthogonal to each other.

The controller images the light received by the first collection objective in a first operational mode, and images the light received by the second collection objective in a second operational mode. The controller may combine information from the image collected in the first operational mode and the image collected in the second operational mode. The controller may combine the information using image processing, machine learning, deep learning, or combinations thereof.

The OTLS microscope may also include illumination optics configured to generate the illumination light sheet. The controller may direct the illumination optics to adjust one or more properties of the illumination light sheet between the first operational mode and the second operational mode.

The OTLS microscope may also operate in an alternate mode where the second collection objective provides an illumination light sheet and the first collection objective receives light from the imaging plane of the sample. The controller may collect a first image when the illumination light sheet is provided by the first collection objective, collect a second image when the illumination light sheet is provided by the second collection objective, and generate an enhanced image based on the first image and the second image. The controller may generate the enhanced image based, at least in part, on a fusion deconvolution algorithm.

BRIEF DESCRIPTION OF THE DRAWINGS

FIGS. 2A-2D are schematic diagrams of a portion of an OTLS microscope according to some embodiments of the present disclosure. FIG. 2A shows a layout of the OTLS microscope, and FIGS. 2B-2D show detailed views of a portion of the microscope of FIG. 2A.

FIG. 3A shows a microscope 3A, and FIGS. 3B and 3C show an expanded view of different arrangements of the illumination and collection objectives that may be used with the microscope of FIG. 3A.

FIGS. 8A-8C are schematic diagrams of reorientation optics which may be used to reorient for the non-orthogonal angle between the illumination and collection axes, while FIG. 8D is a schematic which shows an example operation of the reorientation optics 800c of FIG. 8C in more detail.

DETAILED DESCRIPTION

Figure 1:
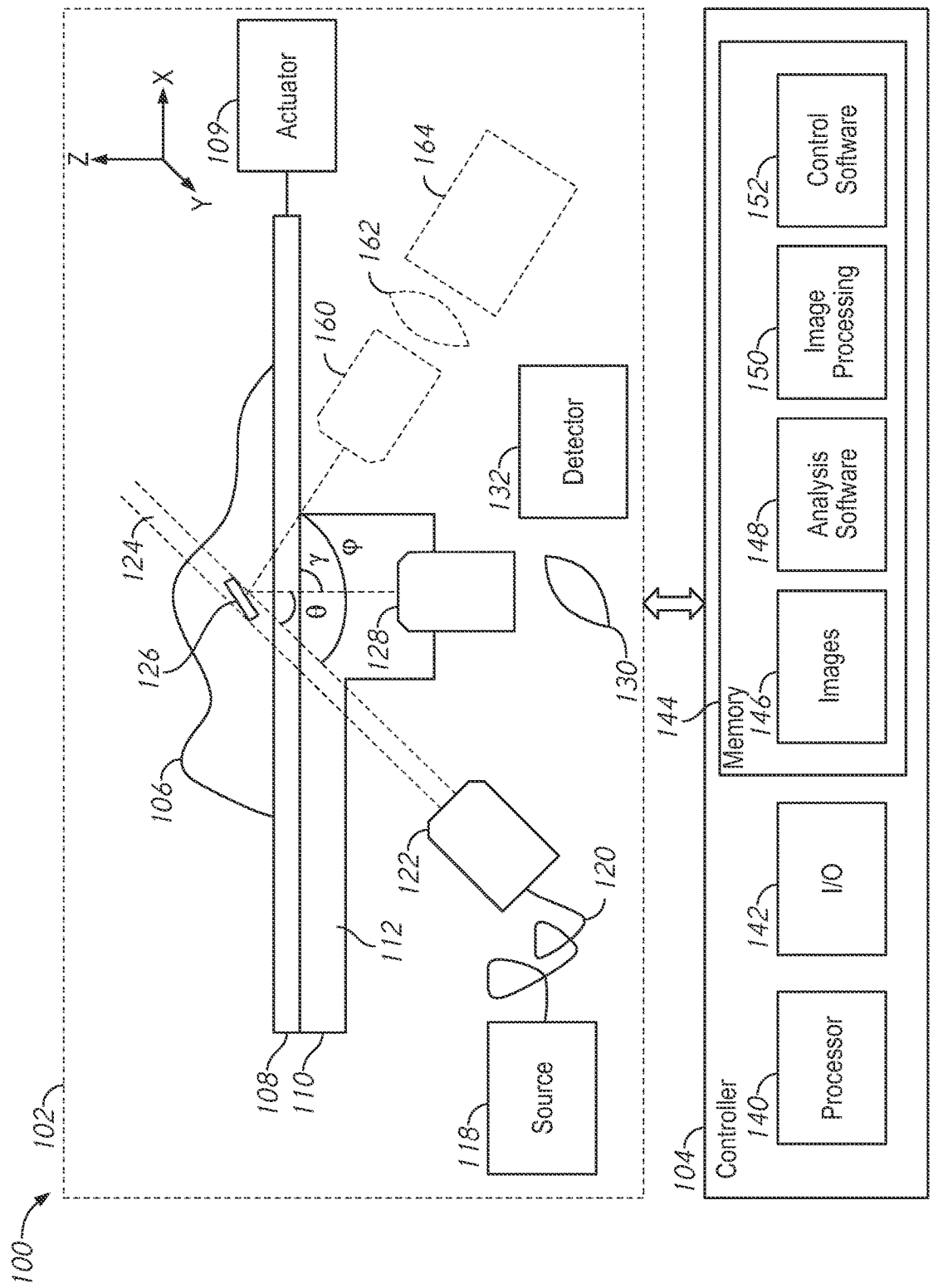
FIG. 1 is a block diagram of an open top light sheet (OTLS) microscope according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

An open top light-sheet (OTLS) microscope includes a sample holder which supports a sample to be imaged on a top side of the sample holder, while the illumination and collection optics are positioned below an opposite, bottom, side of the sample holder. Accordingly, light may pass from an illumination objective, through the sample holder and into an illuminated region of the sample. Light from the illuminated region may pass through the sample holder and to a collection objective, which may image the collected light onto a detector (e.g., a CCD, a CMOS, etc.). It may be advantageous to utilize two separate objective lenses, an illumination objective for directing the illumination light sheet onto the sample, and a collection objective for collecting the light from the sample and directing it towards the detector.

Some OTLS microscopes may use an orthogonal geometry between the optical axes of the illumination and collection objectives. For example, the illumination and collection axes may each be at 45° relative to the specimen and at 90° relative to each other. Such designs may present drawbacks. For example, the imaging resolution that can be achieved is limited by the NA of the objectives (illumination and/or collection). Higher NA objectives enable higher resolution, but they also tend to have shorter working distances, and thus shorter imaging depth into the specimen. This limitation may be exacerbated if the objectives are oriented at an oblique angle to the sample because the working distance of both objectives is oriented such that light must travel a further distance to reach the imaging region. This may limit the imaging depth in relatively thicker specimens, and thus the thickness of specimens that can be imaged with desired high resolution. Another example drawback is that for OTLS microscopes with high NA objectives, the quality of off-axis focused beams (i.e. not orthogonal relative to the sample) may be severely degraded (aberrated) by very small refractive index disparities between the cleared tissue, sample holder, and immersion medium. Thus, such systems may impose relatively strict requirements for the refractive index matching of the immersion liquid, specimen holder, and tissue. It may be desirable to engineer a microscope which overcomes one or more of these challenges.

The present disclosure is directed to an open-top light-sheet microscope with a non-orthogonal arrangement of illumination and collection objectives. In other words, the illumination objective may have an illumination optical axis and the collection objective may have a collection optical axis and the illumination and collection optical axes are non-orthogonal to each other. In some embodiments, the collection objective may be roughly orthogonal to a plane of the sample holder (e.g., the collection axis may be normal to the surface which supports the sample), while the illumination objective is non-orthogonal (e.g., at a 45° angle). This may allow for an OTLS microscope where the collection objective is able to use its full imaging depth (working distance). This, in turn, may make it easier to use relatively high NA collection objectives (which tend to have shorter working distances), which may allow for high resolution imaging of the sample. The use of this geometry may also reduce index matching requirements for the collection path, since the collected light may pass at low angle of incidence through the sample holder. This geometry also may be advantageous because it does not impose lateral constraints on the movement of the sample.

In some embodiments, the OTLS microscope may include a second collection objective which may be oriented orthogonally to the illumination objective (and non-orthogonally to the sample holder). The OTLS microscope may include optics which allow for swapping between the two optical paths (e.g., the two collection objectives). The first collection objective, which is non-orthogonal to the illumination (and which may be orthogonal to a plane of the sample holder) may be a higher NA than the second collection objective, which is orthogonal to the illumination objective. Use of two collection paths may allow the microscope to operate in both a high and low magnification mode, which may be useful, for example, for screening a sample with the lower NA (and thus larger field of view) objective to identify regions of interest, and then studying those regions in more detail with the higher NA objective. The resolution of the microscope may be tuned by adjusting the illumination and/or collection optics.

FIG. 1 is a block diagram of an open top light sheet (OTLS) microscope according to some embodiments of the present disclosure. FIG. 1 shows an optical system 100 which includes an open top light sheet (OTLS) microscope 102 and an optional controller 104 which may operate the microscope 102 and/or interpret information from the microscope 102. In some embodiments, one or more parts of the controller 104 may be omitted, and the microscope 102 may be operated manually. In some embodiments, one or more parts of the controller 104 may be integrated into the microscope 102.

The microscope 102 includes a sample holder 108 which supports a sample 106 along a top side of the sample holder 108. The microscope 102 has an illumination path and collection path which are separate from each other. The illumination path includes a source 118, illumination optics 120, and an illumination objective 122. The illumination path provides an illumination beam 124 which passes through the sample holder 108 to illuminate the sample 106. The collection path includes a collection objective 128, collection optics 130, and a detector 132. The collection path may collect light from a focal region 126 which is illuminated by the illumination beam 124. The optical axis of the collection objective 128 may be at an angle θ relative to an optical axis of the illumination objective 122 (e.g., at an angle θ relative to the illumination beam 124). The angle θ may be non-orthogonal (e.g., an acute angle). Such an arrangement of illumination and optical components may generally be referred to as a non-orthogonal, dual objective (NODO) system.

The illumination objective 122 and collection objective 128 may generally be located beneath a bottom side of the sample holder 108. This may leave the top side of the sample holder 108 relatively open, which in turn may allow for ease of placing samples 106 onto the sample holder 108. For example, the sample holder may have a top surface which is a flat plate (e.g., analogous to a commercial flatbed scanner) and different samples may be placed onto the flat plate. This may also reduce/eliminate lateral constraints on the sample 106.

In some embodiments, the microscope 102 may include an additional optional second collection objective 160. The second collection objective 160 may image the focal region 126 with a collection axis that is at an angle φ with respect to the illumination axis of the illumination beam 124. The angle φ may be greater than the angle θ. In some embodiments, the angle φ may be about 90° (e.g., orthogonal). Imaging with the second collection objective 160 may be referred to as orthogonal dual-objective (ODO) imaging. The second collection objective 160 may have its own collection optics 162 coupling the collected light to a detector 164. In some embodiments, rather than use a second detector 164, the detector 132 may be shared by both collection objectives 128 and 160. Example embodiments with multiple collection objectives are described in more detail in FIGS. 3-7.

In some embodiments, the microscope 102 may include an optional immersion fluid chamber 110, which in turn contains an immersion fluid 112. The immersion fluid 112 may help couple the illumination and/or collected light into the sample. For example, the immersion fluid 112 act as an index matching fluid with the sample holder 108 and/or sample 106, which may reduce the refraction of light passing through it. In some embodiments, one or both of the illumination objective 122 and collection objective 128 may be an air objective, surrounded by an ambient medium (e.g., air). Accordingly, light may pass between air and the immersion fluid 112. An optional optical element, such as a lens or window, may help couple light between the air/immersion fluid interface(s). In some embodiments, one or both of the illumination objective 122 and collection objective 128 may be immersion objectives, where at least a portion of the objective (e.g., the front lens) is in contact with the immersion fluid 112. For example, the illumination objective 122 may be an air objective, and the illumination beam 124 may pass through air, through a lens/window (not shown) into the immersion fluid 112 before reaching the sample 126. Light from the focal region 126 may be collected by the collection objective 128 through the immersion fluid 112 without passing through air.

The source 118 provides illumination light along the illumination path to illuminate a focal region 126 of a sample 106. The source 118 may be a narrow band source, such as a laser or a light emitting diode (LED) which may emit light in a narrow spectrum. In some embodiments, the light may be a broadband source (e.g., an incandescent source, an arc source) which may produce broad spectrum (e.g., white) illumination. In some embodiments, one or more portions of the illumination light may be outside of the visible range. In some embodiments, a filter (not shown) may be used as part of the illumination path to further refine the wavelength(s) of the illumination light. For example, a bandpass filter may receive broadband illumination from the source 118, and provide illumination light in a narrower spectrum. In some embodiments, the light source 103 may be a laser, and may generate collimated light.

In some embodiments, the optical system 100 may be used to image fluorescence in the sample 106. The illumination beam 124 may include light at a particular excitation wavelength, which may excite fluorophores in the sample 106. The illumination beam 124 may include a broad spectrum of light which includes the excitation wavelength, or may be a narrow band centered on the excitation wavelength. In some embodiments, the light source 118 may produce a narrow spectrum of light centered on (or close to) the excitation wavelength. In some embodiments, filter(s) (not shown) may be used in the illumination optics 120 to limit the illumination beam 124 to wavelengths near the excitation wavelength. Once excited by the illumination beam 124, the fluorophores in the sample 106 may emit light (which may be centered on a given emission wavelength). The collection path (e.g., collection optics 130) may include one or more filters which may be used to limit the light which reaches the detector 132 to wavelengths of light near the emission wavelength.

The illumination optics 120 may couple the light from the source 118 to the illumination objective 122. For example, the illumination optics 120 may include an optical fiber which carries light from the source 118 to a back end of the illumination objective 122. In some embodiments, the illumination optics 120 may couple the light between the source 118 and the objective 122 without substantially altering the light provided by the source 118. In some embodiments, the illumination optics 120 may alter the shape, wavelength, intensity and/or other properties of the light provided by the source 118. For example, the illumination optics 120 may receive broadband light from the source 118 and may filter the light (e.g., with a filter, diffraction grating, acousto-optic modulator, etc.) to provide narrow band light to the objective 122.

In some embodiments, the illumination optics 120 may include scanning optics (e.g., scanning mirrors) which may be used to scan the illumination light. In some embodiments, the scanning optics may be used to generate the illumination beam 124 in the form of a light sheet (e.g., by scanning the light back and forth in one axis, but not in another). In some embodiments, the scanning optics may be used to change a position of a field of view relative to the sample 106.

In some embodiments, the illumination optics 120 may be adjustable. For example, if the microscope 102 supports more than one imaging mode (e.g., multiple collection objectives which share the same illumination objective), then the illumination optics 120 may include one or more components which may be adjusted or tuned depending on the imaging mode. An example microscope which uses multiple imaging modes is discussed in more detail in FIG. 3, and an example of tuning the illumination optics 120 is discussed in more detail in FIG. 5.

The illumination path may provide an illumination beam 124 which is a light sheet as part of light sheet microscopy or light-sheet fluorescent microscopy (LSFM). The light sheet may have a generally elliptical cross section, with a first numerical aperture along a first axis (e.g., the y-axis) and a second numerical aperture greater than the first numerical aperture along a second axis which is orthogonal to the first axis. The illumination optics 120 may include optics which reshape light received from the source 118 into an illumination sheet. For example, the illumination optics 120 may include one or more cylindrical optics which focus light in one axis, but not in the orthogonal axis.

In some embodiments, the illumination optics 120 may include scanning optics, which may be used to scan the illumination beam 124 relative to the sample 106. For example, the region illuminated by the illumination beam may be smaller than the desired focal region 126. In this case, the illumination optics 120 may rapidly oscillate the illumination beam 124 across the desired focal region 126 to ensure illumination of the focal region 126.

The illumination objective 122 may include one or more lenses which provide the illumination beam 124. For example, the illumination objective 122 may focus the illumination beam 124 towards the focal region 126. The sample holder 108 may position the sample 106 such that the focal region 126 is generally within the sample 106. In some embodiments, the sample holder 108 may include one or more actuators which may position the sample 106 relative to the focal region 126. The illumination objective may, in some embodiments, be a commercial objective lens which includes one or more internal optical elements. In some embodiments, the illumination objective 122 may be surrounded by an ambient environment (e.g., air), and the illumination objective 122 may be an air objective. The illumination objective 122 may be characterized by one or more numerical apertures, which may be based on the angle(s) at which light converges at the focal region 126. In some embodiments, the illumination objective 122 may be an immersion objective, and at least a portion of the illumination objective 122 may be in contact with the immersion fluid 112.

In some embodiments, the focal region 126 may be idealized as a focal plane. The illumination beam 124 may be directed onto the sample 106 to generate a focal region 126. The focal region 126 may be idealized as a flat (e.g., 2D) plane illuminated by the illumination light sheet 124. The focal plane may be aligned with the illumination light sheet 124 and may represent a region imaged by the illumination beam 124 from which the collection objective 128 can collect light. In some embodiments, the focal region 126 may represent a single field of view of the collection objective 128. In some embodiments, the focal region 126 may represent an area that the field of view of the collection objective 128 may be scanned across.

The sample 106 may be supported by an upper surface of the sample holder 108. In some embodiments, the sample 106 may be placed directly onto the upper surface of the sample holder 108. In some embodiments, the sample 106 may be packaged in a container (e.g., on a glass slide, in a well plate, in a tissue culture flask, etc.) and the container may be placed on the sample holder 108. In some embodiments, the container may be integrated into the sample holder 108. In some embodiments, the sample 106 may be processed before imaging on the optical system 100. For example, the sample 106 may be washed, sliced, and/or labelled before imaging.

In some embodiments, the sample 106 may be a biological sample. For example, the sample 106 may be a tissue which has been biopsied from an area of suspected disease (e.g., cancer). In some embodiments, the tissue may undergo various processing, such as optical clearance, tissue slicing, and/or labeling before being examined by the optical system 100. In some embodiments, examination of the tissue with the optical system 100 may be used for diagnosis, to determine treatment progress, to monitor disease progression, etc.

In some embodiments, the sample 106 may be non-biological. For example, the sample 106 may be a fluid, and may contain one or more components for investigation. For example, the sample 106 may be a combustion gas, and the optical system 106 may perform particle image velocimetry (PIV) measurements to characterize components of the gas.

In some embodiments, the sample 106 may include one or more types of fluorophores. The fluorophores may be intrinsic to the sample 106 (e.g., DNA and proteins in biological samples) or may be a fluorescent label (e.g., acridine orange, Eosin) applied to the sample 106. Some samples 106 may include a mix of intrinsic types of fluorophores and fluorescent labels. Each type of fluorophore may have an excitation spectrum, which may be centered on an excitation wavelength. When a fluorophore is excited by light in the excitation spectrum, it may emit light in an emission spectrum, which maybe centered on an emission wavelength which is different than (e.g., red-shifted from) the excitation wavelength.

The sample holder 108 may support the sample 106 over a material which is generally transparent to illumination beam 124 and to light collected from the focal region 126 of the sample 106. In some embodiments, the sample holder 108 may have a window of the transparent material which the sample 106 may be positioned over, and a remainder of the sample holder 108 may be formed from a non-transparent material. In some embodiments, the sample holder 108 may be made from a transparent material. For example, the sample holder 108 may include a glass plate which supports the sample 106.

In some embodiments, the sample holder 108 may include one or more structures to support the sample 106. For example, the sample holder 108 may include clips or a well. In some embodiments, the sample holder 108 may be a modular component of the system 100, and different sample holders 108 may be swapped in or out depending on the type of sample, the type of imaging, the wavelengths of the illumination/collected light, and combinations thereof.

The sample holder 108 may have a second surface (e.g., a lower surface) which is opposite the surface of the sample holder 108 which supports the sample 106. In some embodiments, an immersion chamber 110 which holds an immersion fluid 112 may be positioned below the second surface of the sample holder 108. In some embodiments, the immersion chamber 110 may have an open top, and the immersion fluid 112 may be in contact with the second surface of the sample holder 108. In some embodiments, while the second surface of the sample holder 108 may be in contact with the immersion fluid 112, the first surface of the sample holder 108 (which supports the sample 106) may be in contact with the same environment as the objectives 122 and 128 (e.g., air).

The sample holder 108 may be coupled to an actuator 109, which may be capable of moving the sample holder 108 in one or more directions. In some embodiments, the sample holder 108 may be movable in one or more dimensions relative to the immersion chamber 110 and objectives 122 and 128. For example, the sample holder 108 may be movable along the x-axis, y-axis, and/or z-axis, and/or may rotated (e.g., tip, tilt, etc.). The sample holder 108 may be moved to change the position of the focal region 126 within the sample 106 and/or to move the sample holder 108 between a loading position and an imaging position. In some embodiments, the actuator may be a manual actuator, such as screws or coarse/fine adjustment knobs. In some embodiments, the actuator may be automated, such as an electric motor, which may respond to manual input and/or instructions from a controller 104. In some embodiments the actuator 109 may respond to both manual adjustment and automatic control (e.g., a knob which responds to both manual turning and to instructions from the controller 104).

The optional immersion chamber 110 contains the immersion fluid 112. In some embodiments, the immersion chamber 110 may include a source and/or sink, which may be useful for changing out the immersion fluid 112. For example, the immersion chamber 110 may be coupled to a fluid input line (which in turn may be coupled to a pump and/or reservoir) which provides the immersion fluid 112 and a drain which may be opened to remove the immersion fluid 112 from the immersion chamber 110. As described in more detail herein, the type of immersion fluid may be chosen based on a refractive index of the sample 106 and/or sample holder 108.

The collection path may receive light from a focal region 126 and direct the received light onto a detector 132 which may image and/or otherwise measure the received light. The light from the focal region 126 may be a redirected portion of the illumination beam 124 (e.g., scattered and/or reflected light), may be light emitted from the focal region 126 in response to the illumination beam 124 (e.g., via fluorescence), or combinations thereof. The collected light may pass through the sample holder 108 towards the collection objective 128.

In the NODO geometry of FIG. 1, the collection path may have a principle optical axis arranged at an angle $\gamma$ relative to the plane of the sample holder 108 (e.g. the XY-plane of FIG. 1). In some embodiments, such as the one illustrated in FIG. 1, the angle $\gamma$ may be approximately 90°, i.e. the collection path may have a principle optical axis which is approximately orthogonal to the plane of the sample holder 108. The angle $\gamma$ may be sufficiently close to 90°, i.e. may be approximately orthogonal, if the quality of the image collected by the collection objective remains diffraction limited, i.e. using as a figure of merit the Strehl ratio, where the Strehl ratio is greater than approximately 0.8. As will be apparent to the artisan, the Strehl ratio can depend on many parameters potentially applicable to a given OTLS microscopy system, such as index mismatch (i.e. the optical path difference, or the product of the refractive index difference between the holder and the immersion medium/cleared tissue sample and the thickness of the holder), the NAs of the illumination and collection objectives, the field of view of the objective, the wavelength of the illumination light and/or collected light, and the particular objective used, in addition to the angle $\alpha$.

The illumination path may have a principle optical axis arranged at an angle $\theta$ relative to the principle optical axis of the collection path, and the angle $\theta$ may be non-orthogonal, i.e. may be an acute angle. Several considerations can bound the range of acceptable values of the angle $\theta$. For example, it may be impractical for the angle to be at or near 90°, i.e. near parallel to the plane of the specimen holder, because it would intersect with the specimen holder, and constrain the lateral dimensions of the specimen. Index matching constraints may also become too onerous, even for the relatively lower NA of the illumination beam. Other factors may limit the lower end of the range of values for the angle $\theta$, including the physical constraints imposed by the mechanical housing of the collection objective. Example limitations imposed by the geometry of the objectives is discussed in more detail in FIG. 2.

The geometry of the focal region 126 may be defined in part by the field of view of the collection path, which in turn may depend in part on the numerical aperture of the collection objective 128. Similar to the illumination objective 122, the collection objective 128 may be a commercial objective which includes one or more lenses. In some embodiments, the collection objective 128 may be an air objective. In some embodiments, the collection objective 128 may be an immersion objective (e.g., an oil immersion objective). In some embodiments, the collection objective 128 may use a different immersion medium than the immersion fluid 112 used in the illumination path. In some embodiments, the focal region which the collection path is focused on and the focal region which the illumination path is focused on may generally overlap at the focal region 126. In some embodiments, the illumination and collection paths may have different shapes, sizes, and/or locations of their respective focal regions.

The collection path includes collection optics 130 which may redirect light from the collection objective onto the detector 132. For example, the collection optics 130 may be a tube lens designed to focus light from the back end of the collection objective into an image which is projected on the detector 132. In some embodiments, the collection optics 130 may include one or more elements which alter the light received from the collection objective 128. For example, the collection optics 130 may include filters, mirrors, de-scanning optics, or combinations thereof.

The collection optics 130 may include optics which may reorient a view of the focal region 126. Since the axis of the collection objective 128 is at an angle $\theta$ relative to the focal region 126, the image may be distorted. The collection optics 130 may include one or more features which may reorient the image to account for the angle $\theta$ before the image is projected on the detector 132. For example, the collection optics 130 may include a remote focus, where a first lens projects an image of the light collected by the collection objective 128, and a second lens images that remote image at an angle which cancels out the angle $\theta$. This may correct the distortion due to the angle $\theta$ before the light reaches the detector 132. Other methods of reorienting the image may be used in other example embodiments.

The detector 132 may be used for imaging the focal region 126. In some embodiments, the detector 132 may represent an eyepiece, such that a user may observe the focal region 126. In some embodiments, the detector 132 may produce a signal to record an image of the focal region 126. For example, the detector 132 may include a CCD or CMOS array, which may generate an electronic signal based on the light incident on the array.

The microscope 102 may be coupled to a controller 104 which may be used to operate one or more parts of the microscope 102, display data from the microscope 102, interpret data from the microscope 102, or combinations thereof. In some embodiments, the controller 104 may be separate from the microscope, such as a general purpose computer. In some embodiments, one or more parts of the controller 104 may be integral with the microscope 102.

The controller 104 includes one or more input/output devices 142, which may allow a user to view feedback from the controller 104, data from the microscope 102, provide instructions to the controller 104, provide instructions to the microscope 102, or combinations thereof. For example, the input/output device 142 may include a digital display, a touchscreen, a mouse, a keyboard, or combinations thereof.

The controller 104 includes a processor 140, which may execute one or more instructions stored in a memory 144. Instructions may include control software 152, which may include instructions about how to control the microscope 102. Based on the control software 152, the processor 140 may cause the controller 104 to send signals to various components of the microscope 102, such as the actuator 109. Instructions may include image processing software 150, which may be used to process images 146 either 'live' from the detector 132 or previously stored in the memory 144. The image processing software 150 may, for example, remove background noise from an image 146. Instructions may include analysis software 148, which may be executed by the processor 140 to determine one or more properties of the images 146. For example, the analysis software 148 may highlight cell nuclei in an image 146.

In some embodiments, the controller 104 may direct the microscope to collect images from a number of different fields of view in the sample. For example, the controller 104 may include instructions to collect a depth stack of images. The controller 104 may direct the detector 132 to collect a first image, and then instruct the actuator 109 to move the sample holder 108 a set distance in a vertical direction (e.g., along the z-axis). This may also move the sample 106 relative to the focal region 126 which may change the height within the sample at which the focal region 126 is located. The controller 104 may then instruct the detector 132 to collect another image and then repeat the process until a set number of images in the stack and/or a set total displacement in the z-direction have been achieved. The analysis software 148 may then combine the depth stack of images to allow for 3D (or pseudo-3D) imaging of the sample 106. In a similar fashion, various other translations may be used to collect multiple fields of view. For example, the sample may be scanned in the x, y, and/or z-axis. The geometry of the OTLS may be particularly useful for scanning in the X or Y direction, as the location of the objectives (and other optics) under the sample holder 108 may allow for less constrained scanning in these directions.

In some embodiments, the controller 104 may aid in switching the microscope 102 between one or more operational (or imaging) modes. For example, the controller 104 may actuate various components, or activate/deactivate one or more components. For example, in a first imaging mode, light may be collected from the collection objective 128, while in a second imaging mode, light may be collected through a different collection objective (not shown in FIG. 1). Example embodiments with multiple imaging modes is discussed in more detail in FIGS. 3-6B.

Figure 2C:
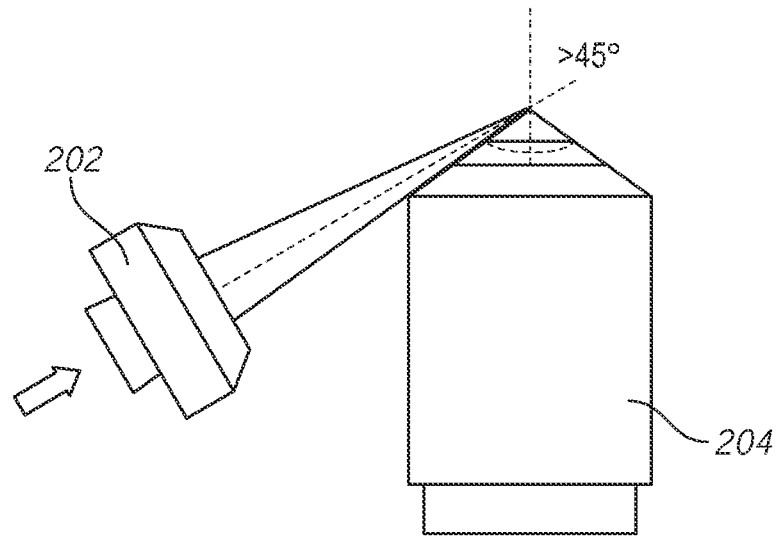
Figure 2D:
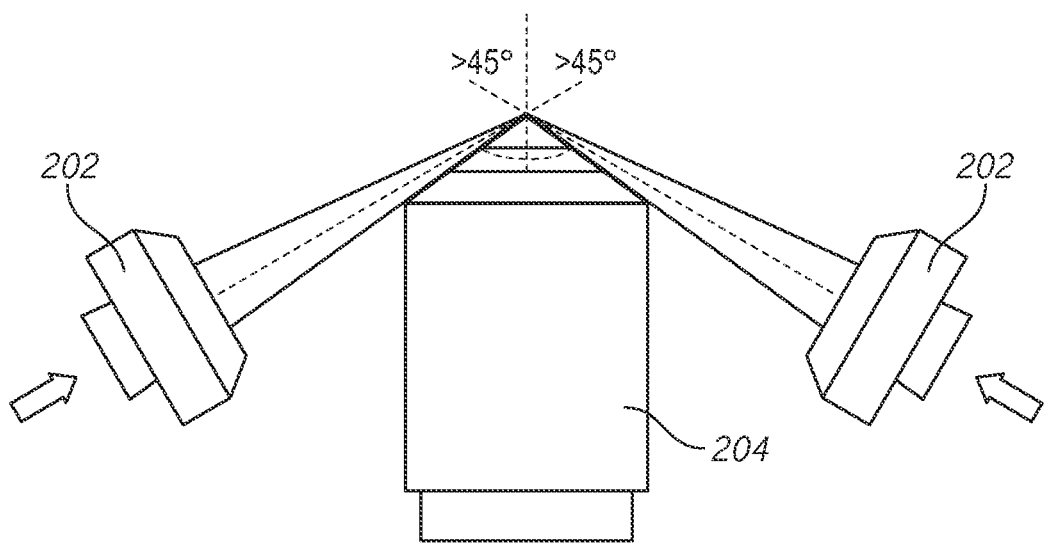

FIGS. 2A-2D are schematic diagrams of a portion of an OTLS microscope according to some embodiments of the present disclosure. FIG. 2A shows a layout of the OTLS microscope, and FIGS. 2B-2D show detailed views of a portion of the microscope of FIG. 2A. The OTLS microscope 200 may, in some embodiments, be included in the microscope 102 of FIG. 1. For the sake of brevity, details and operations already described with respect to FIG. 1 will not be repeated again with respect to FIG. 2.

FIG. 2 shows a schematic view of a microscope which focuses on the interaction of the illumination and collection optics with the immersion chamber and sample, along with a portion of the collection optics. The microscope 200 may include additional components, which have been omitted from FIG. 2 for the sake of clarity in the drawing.

The microscope 200 includes an illumination objective 202, which receives illumination light from an illumination source and optional other illumination optics (not shown) and directs an illumination beam 218 through a lens 218 into an immersion fluid 222. The immersion fluid 222 is contained by an immersion chamber 220. The immersion light 218 passes through a bottom surface of a sample holder 226 into a sample 228. Collected light 216 passes out of the sample 228, through the sample holder 226 and immersion fluid 222 into a collection objective 204. The principle axis of the illumination light 218 may be non-orthogonal to the plane of the sample holder 226, while the principle axis of the collected light 216 may be approximately orthogonal to the plane of the sample holder 226. Accordingly, the illumination light 218 and collected light 216 may be non-orthogonal to each other.

The microscope 200 shows example reorientation optics 230, which may be used to accommodate the non-orthogonal angle θ between the illumination light 218 and the collected light 216. Various types reorientation optics 230 may used. The example of FIG. 2 shows a particular implementation of the reorientation optics 230 which uses a remote image 212. However other embodiments may use other schemes to achieve the reorientation optics 230. Various example reorientation optics which may be used in place of the reorientation optics 230 of FIG. 2 are discussed in FIGS. 8A-8D.

In the reorientation optics 230 of FIG. 2, the collection objective 204 may direct light through optional transfer optics 210 into a second collection objective 206. The second collection objective 206 may generate a remote image 212, which may be imaged by a third collection objective 208. The second collection objective 206 and third collection objective 208 may be at an angle. This angle may be based on the angle between the collected light 216 and the illumination light 218. The third collection objective 208 may direct the light to a detection system (not shown).

The illumination objective 202 may be an air objective, where a proximal lens (e.g., the lens which emits the illumination beam 218) is positioned in air. In some embodiments, the illumination objective 202 may be entirely positioned in air. However, at least a portion of the sample holder 226 may be positioned in contact with the immersion fluid 222. A lens 224 may couple the illumination light 218 from the air which surrounds the illumination objective 202 and into the immersion fluid 222.

In some embodiments, the lens 224 may be shaped to reduce the refraction of light as it passes from the air, through the material of the lens 224 and into the immersion fluid 222. In some embodiments, the lens 224 may be made of a material which has an index of refraction matched to the index of refraction of the immersion fluid 222. In some embodiments, the lens 224 may have one or more surfaces shaped to match a wavefront of the light passing through it, which may eliminate/reduce refraction of the light passing through the lens 224. For example, the lens 224 may be a solid immersion (SIL) lens or a solid immersion meniscus lens (SIMlens), as disclosed in U.S. Pat. No. 10,409,052 and PCT Publication No. WO 2020/150239, the disclosures of which are incorporated herein by reference.

After passing through the lens 224, the illumination beam 218 may pass through the immersion fluid 222 until it encounters the sample holder 226. The immersion fluid 222 may have an index of refraction which matches an index of refraction of the sample holder 226. This may help to minimize/prevent refraction of the illumination beam 218 as it passes from the immersion fluid 222 into the material of the sample holder 216. In turn, the index of refraction of the sample holder 216 may be chosen so that it matches the index of refraction of the sample 228 (and the immersion fluid 222). This may minimize/prevent refraction of the illumination beam 218 as it passes from the sample holder into the sample 228.

In some embodiments, the sample 228 and sample holder 226 may be immersed in the immersion fluid 222. In some embodiments, a bottom surface of the sample holder 226 may be in contact with the immersion fluid 222, but the top surface which supports the sample 228 may be in contact in air. For example, the sample holder 226 may act as a lid of the immersion chamber 220.

The collected light 216 may exit the sample 228 and pass through the sample holder 226 and immersion fluid 222 before entering a proximal lens of the collection objective 204. The collection objective may be an immersion objective, where the proximal lens is in contact with the immersion fluid 222. A distal end of the collection objective 204 may be positioned outside of the immersion fluid 222 in the ambient environment (e.g., in air). The collected light 216 may represent a portion of the light which leaves the sample 228 which passes through the collection objective 204 and other collection optics to reach the detector. The size and geometry of the collected light 216 may be based, at least in part, on the collection objective 204 and other collection optics.

The proximal lens of the collection objective 204 may be located much closer to the sample 228 than the proximal lens of the illumination objective 202. This may allow the collection objective 204 to be a higher NA objective than the illumination objective 202. Since the collection objective 204 is approximately orthogonal to the plane of the sample holder 226, refraction may be reduced (compared to the illumination beam 218). In some embodiments, the collection objective 204 may be an air objective, and rather than being immersed in the immersion fluid 222, it may be separated from the immersion fluid 222 by a window.

A back end of the collection objective 204 may direct light to a second collection objective 206 through optional transfer optics 210. The transfer optics 210 may, in some embodiments, include one or more lenses. For example, the transfer optics 210 may be a 4f relay system.

The microscope 200 of FIG. 2 includes optional features for reorienting the image collected by the collection objective 204. For example, the second collection objective 206 may project a remote image 212. The remote image 212 may be used to correct for the angle between the illuminated plane in the sample 222 (e.g., the illumination beam 218) and the collected light 216. The remote image 212 may be imaged by a third collection objective 208. To correct for the angle between the illumination beam 218 and the collected light 216, the third collection objective 208 may image the remote image 212 at an angle relative to the second collection objective 206. The angle may be based on the angle between the illumination and collected light. For example, if the angle between the illumination beam 218 and the collected light 216 is θ, then the angle between the second objective 206 and the third objective 208 may be 90°−θ. For example, if the angle θ is about 45°, then the angle between the second collection objective 206 and third collection objective 208 may also be roughly 45°.

For example, as shown in FIG. 2B, the example mechanical housing of the collection objective lens permits illumination optical paths at 45° on both sides, with a maximum cone angle of β (e.g., the angle between the optical axis of the illumination light 218 and the edge of the collection objective 204. In some embodiments, the angle β may be about 7.1° (e.g., the illumination light may have a NA of about 0.12 in air). The maximum cone angle may vary based on the size/shape of the mechanical housing of the objective 204, and other angles may be used in other example embodiments.

For an OTLS system with a single collection objective with a relatively high NA, the angle θ may be greater than 45°, as shown in FIG. 2C. In some embodiments, it may be desirable to have two illumination objectives, for dual-sided illumination, and use the same relatively high NA single collection objective, as shown in FIG. 2D. FIG. 2D shows an embodiment with a second illumination objective 240. Each of the illumination objectives 202 and 240 may be positioned at a non-orthogonal angle with respect to the axis of the collection objective 204. In the embodiment of FIG. 2D, both are positioned at an angle which is greater than 45°. Other angles (e.g., angles which are less than or equal to 45°) may be used in other example embodiments.

Collection objective lenses with larger, shallower angle housings may further constrain the range of illumination optical path angles. From another perspective, the illumination light sheet may be tilted to an extent (i.e. different from orthogonal) that it does not stay within the confocal parameter (depth of focus) of the collection objective for the desired field of view. Taking these considerations into account, a reasonable range for the angle θ may be 40° to 70°. For example, the illumination path may follow a first optical axis which is at a 45° angle with respect to the bottom surface of the sample holder, while the collection path may follow a second optical axis which is at a 90° angle with respect to the plane of the sample holder 108. Accordingly, there may be about a 45° angle between the first and the second optical axes, i.e. the angle θ may be about 45°.

Figure 3A:
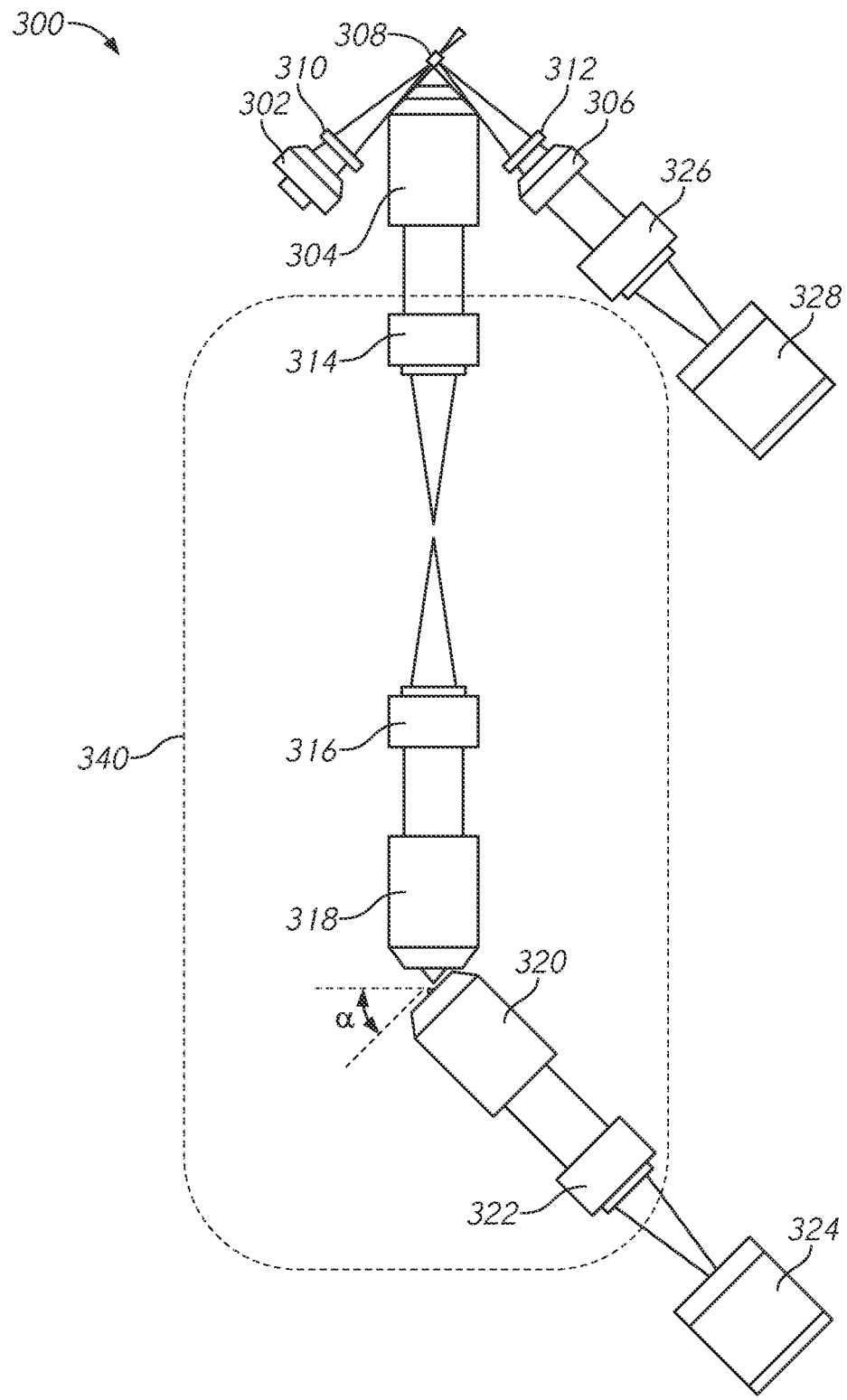
FIGS. 3A-3C are schematic diagrams of an OTLS microscope according to some embodiments of the present disclosure.
Figure 3B:
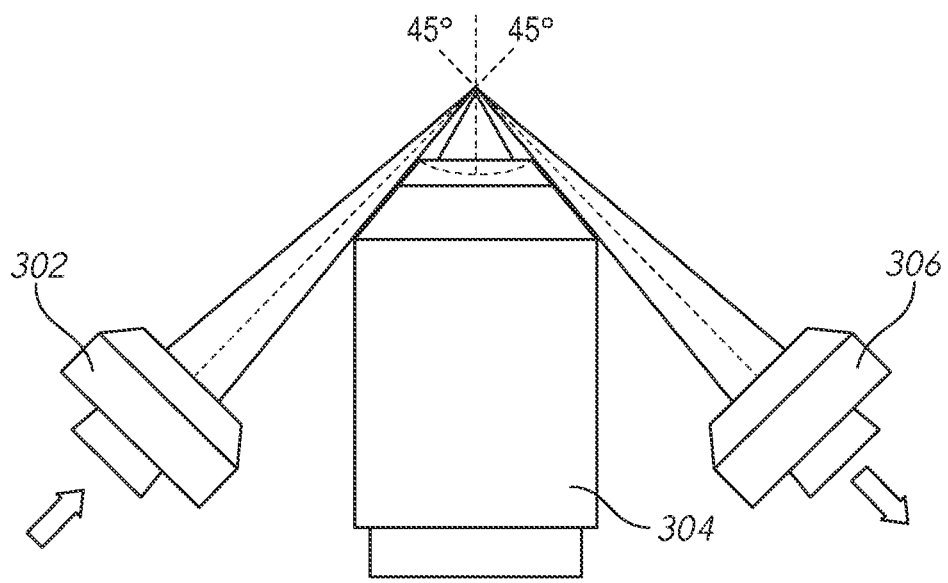
Figure 3C:
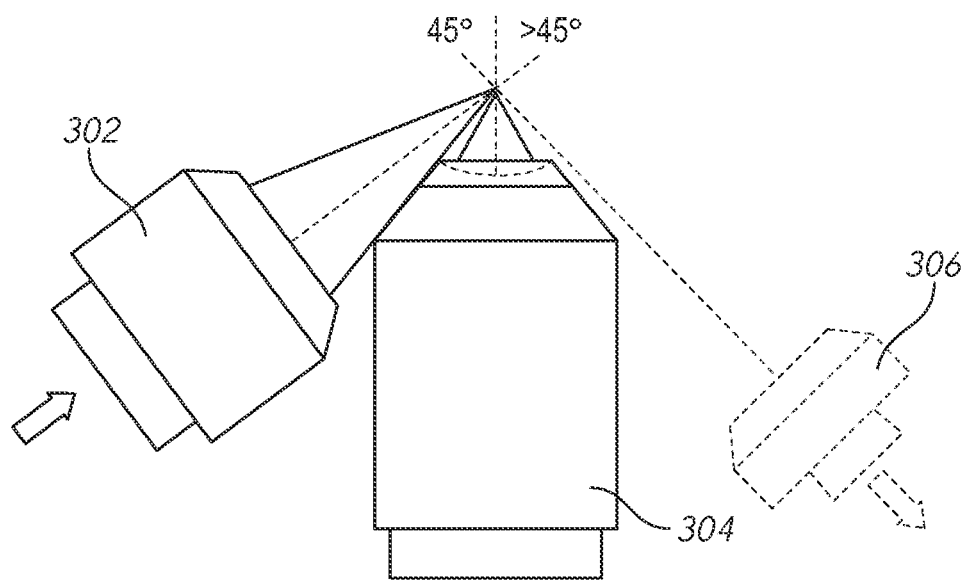

FIGS. 3A-3C are schematic diagrams of an OTLS microscope according to some embodiments of the present disclosure. FIG. 3A shows a microscope 3A, and FIGS. 3B and 3C show an expanded view of different arrangements of the illumination and collection objectives that may be used with the microscope of FIG. 3A. The microscope 300 may, in some embodiments, be included in the microscope 102 of FIGS. 1 and/or 200 of FIG. 2. The microscope 300 may be generally similar to the previously described microscopes, except that the microscope 300 includes an additional imaging path which uses a collection objective which is orthogonal to the illumination sheet, in addition to the non-orthogonal imaging path described in FIGS. 1-2.

Since the non-orthogonal dual objective (NODO) path of the microscope 300 may generally be similar to the operation and components of the microscopes 102 of FIG. 1 and 200 of FIG. 2, for the sake of brevity, features and components already described with respect to FIGS. 1 and 2 will not be repeated with respect to FIG. 3.

The microscope 300 includes a NODO optical path, and an orthogonal dual objective (ODO) path. The NODO path and the ODO path may share certain components, such as the illumination path. The microscope 300 includes an illumination objective 302 which directs an illumination light sheet through a lens 310 (e.g., a SIL or SIMlens) into an immersion fluid (not shown) towards a sample 308. A first collection objective 304 may collect light from the sample 308 at a non-orthogonal angle to the illumination light sheet. The first collection objective 304 may pass light through a first lens 314 and second lens 316 which may form a relay. The relay may pass the light to a second collection objective 318, which may generate a remote image which is imaged at an angle α by a third collection objective 320. The angle α may be an angle between the optical axis of the objectives 304 and 318, and the optical axis of the objective 320. As shown in FIG. 3, this may also be the angle between the planes which are normal to these axes. The third collection objective 320 may pass light through a third lens 322 which images the light onto a first detector 324.

The path from the light source (not shown) through the illumination objective 302 to the sample 308, and from the sample 308 through the first collection objective 304 and to the first detector 324 may form the NODO light path. The illumination light path and the collected light (e.g., the optical axis of the illumination objective 302 and the first collection objective 304) may be at a non-orthogonal angle θ to each other. The microscope 300 includes reorientation optics 340 (e.g., similar to the reorientation optics 230 of FIG. 2). While a particular implementation of reorientation optics 340 is shown in FIG. 3, other systems for reorienting may be used in other example embodiments. FIGS. 8A-8D include some additional example reorientation optics which may be used as the reorientation optics 340.

The microscope 300 also includes a fourth collection objective 306, which has an optical axis which is approximately orthogonal to the illumination light sheet (e.g., the optical axis of the illumination objective 302). Similar to the illumination objective 302, the fourth collection objective 306 may be an air immersion objective lens, and the fourth collection objective 306 may be separated from an immersion fluid (not shown) by a second lens 310 (e.g., a SIL or SIMlens). The fourth collection objective 306 may collect light from the sample 308 and direct the collected light through one or more ODO collection optics to a second detector 328. For example, the ODO collection optics may include a lens 326 which images the light from the fourth collection objective onto the second detector 328.

The path from the light source (not shown) through the illumination objective 302 to the sample 308, and from the sample 308 through the fourth collection objective 306 to the second detector 328 may form the ODO light path. The illumination light path and the light collected by the fourth collection objective 306 (e.g., the optical axis of the illumination objective 302 and the optical axis of the fourth collection objective 306) may be at an orthogonal angle to each other.

In some embodiments, rather than have a separate first detector 324 and second detector 328, the NODO and ODO optical paths may share a detector. The microscope 300 may include additional optics (e.g., a rotating mirror, shutters, etc.) which may switch whether light from the NODO path or the ODO path is reaching the detector.

In some embodiments, the illumination path may be adjustable, and may be adjusted between the ODO imaging mode and the NODO imaging mode. For example, illumination optics (not shown), such as the illumination optics 120 of FIG. 1, may include adjustable components which may tune the size and shape of the illumination light sheet based on whether the first collection objective 304 or the fourth collection objective 306 is being used. For example, the illumination optics may include a variable beam expander, which may be used to adjust properties of the illumination light sheet, such as the NA and/or width of the light sheet. The adjustment of the illumination light sheet may be manual, automatic (e.g., managed by the controller), or combinations thereof. Adjustments to the illumination path are described in more detail in FIG. 5.

In an example operation, a sample may be placed on the microscope, and the sample may be screened using the ODO optical path. The ODO path may have a lower resolution and magnification, but also a larger field of view than the NODO path. Accordingly, it may be more efficient to screen the sample using the ODO path. In some embodiments, the sample 308 may be scanned (e.g., by motion of the focal region relative to the sample, by motion of the sample relative to the focal region, or combinations thereof). In some embodiments, multiple fields of view may be stitched together (e.g., by a controller, such as 104 of FIG. 1). In some embodiments, the sample 308 may be scanned in 3 dimensions to build a volumetric image of sample. In some embodiments, the scanning may be performed manually.

After scanning the sample (or a portion of the sample), regions of interest may be identified. In some embodiments, an automated process (e.g., image processing such as segmentation, thresholding, etc., machine learning, and/or deep learning) may identify the regions of interest. In some embodiments, a user (e.g., a clinician) may determine the regions of interest. Once one or more regions of interest are located, the NODO path may be used for high resolution imaging of the regions of interest. In some embodiments, once a region of interest is identified, the microscope 300 may be switched to the NODO mode. Switching to the NODO mode may involve switching which detector is being used for imaging (or which optical path is coupled to the detector). Switching modes may also include adjusting the illumination light sheet.

In the NODO mode, the microscope 300 may have a higher resolution and magnification, but a smaller field of view. The NODO mode may be useful for determining one or more properties of the region of interest. For example, a clinician may identify a region of interest, then switch to NODO mode in order to make a diagnosis. In some embodiments, the resolution and/or field of view in the NODO and/or ODO modes may be adjustable. This may give the microscope 300 a relatively large operating range of different performance characteristics.

In some embodiments, information collected in a first operational (imaging) mode (e.g., a NODO mode) may be combined with information collected in a second operational (imaging) mode (e.g., an ODO mode). This process may be automated. For example, a controller (e.g., 104 of FIG. 1) may image a region in an ODO mode, and then use image processing (e.g., segmentation, thresholding etc.), machine learning, deep learning, or combinations thereof to determine if all or part of the imaged region is a region of interest. The controller may then image the region of interest in more detail using the NODO mode. In some embodiments, the process may be manual and a user may identify regions of interest. In some embodiments, a mix of manual and automated processes (e.g., automated image processing, but manual region of interest identification) may be used.

For an OTLS system with a second collection objective, such as shown in FIG. 3A, the angle θ between the illumination and first collection objective may be optimized at 45°, as shown in FIG. 3B, and the angle between the optical path of the illumination objective and the secondary collection objective may be approximately 90°. For an OTLS system in which it is desirable to have a relatively higher NA illumination objective, it may be desirable to have the angle between the optical paths of the illumination objective and the secondary objective be greater than 90°, as shown in FIG. 3C.

Figure 4:
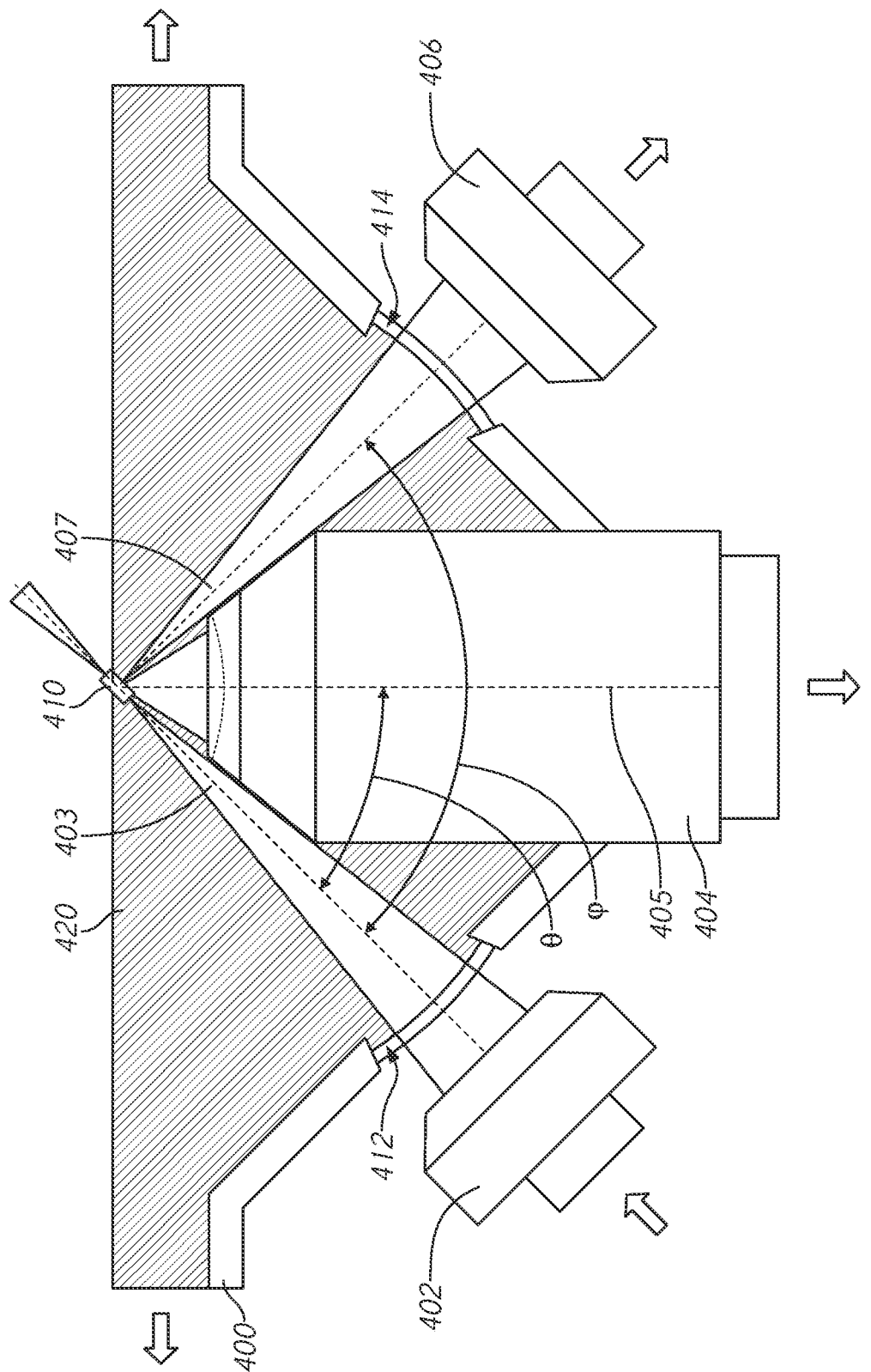
FIG. 4 is a sample holder of a microscope according to some embodiments of the present disclosure.

FIG. 4 is a sample holder of a microscope according to some embodiments of the present disclosure. The sample holder 400 of FIG. 4 may, in some embodiments, be included in a microscope, such as the microscope 300 of FIG. 3, which uses a NODO and ODO optical path. FIG. 4 shows a view focused on the interaction of the objectives with the sample holder 400, and so various components of the microscope may be omitted. For the sake of brevity, operations, features, and components which were previously discussed with respect to FIGS. 1-3 will not be repeated again with respect to FIG. 4.

The sample holder 400 supports an immersion fluid 420. The microscope which includes the sample holder 400 includes a NODO optical path and an ODO optical path. An illumination objective 402 provides an illumination light sheet along an illumination optical axis 403 to a focal region 410. The illumination objective 402 may be an air objective, which is not immersed in the immersion fluid 420. Accordingly a lens 412, such as a SIL or SIMlens, may couple the illumination light sheet into the immersion fluid 420.

A NODO collection objective 404 may receive light from the focal region 410 along an NODO collection axis 405. There may be an angle $\theta$ between the illumination axis 403 and the NODO collection axis 405. The angle $\theta$ may be non-orthogonal, and in some embodiments may be an acute angle such as a 45° angle. The NODO collection objective 404 may be an immersion objective, and at least a portion of the NODO collection objective 404 may be in contact with the immersion fluid 420.

An ODO collection objective 406 may receive light from the focal region 410 along an ODO optical axis 407. There may be an angle $\varphi$ between the illumination axis 403 and the ODO collection axis 407. The angle $\varphi$ may be roughly orthogonal (e.g., about 90°). The ODO collection objective 406 may be an air objective. Similar to the illumination objective 402, the ODO collection objective 406 may be an air objective. Accordingly, a lens 414 (e.g., a SIL, a SIMlens) may separate the ODO collection objective 406 from the immersion fluid 420.

As may be seen from the view of FIG. 4, and as discussed above, the objectives 402, 404, and 406 may be positioned such that the NODO collection objective 404 does not block the light from the illumination objective 402 or the ODO collection objective 406. The angles of the light from the illumination objective 402 and collected by the ODO collection objective 406 may be based, in part, on those objectives respective NA's. Accordingly, the NA's of those objectives as well as the size and shape of the NODO objective 404 may be designed to not interfere with each other.

Figure 5B:
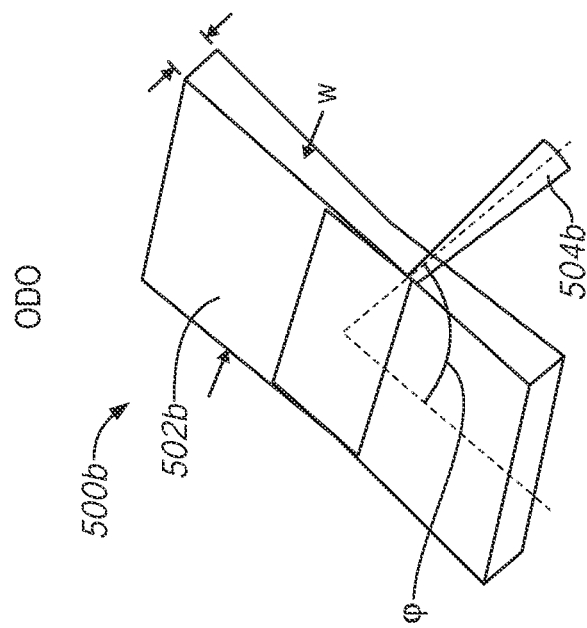
FIGS. 5A-5B are schematic diagrams of illumination and collected light in a first and second operational mode of an OTLS microscope, respectively.
Figure 5A:
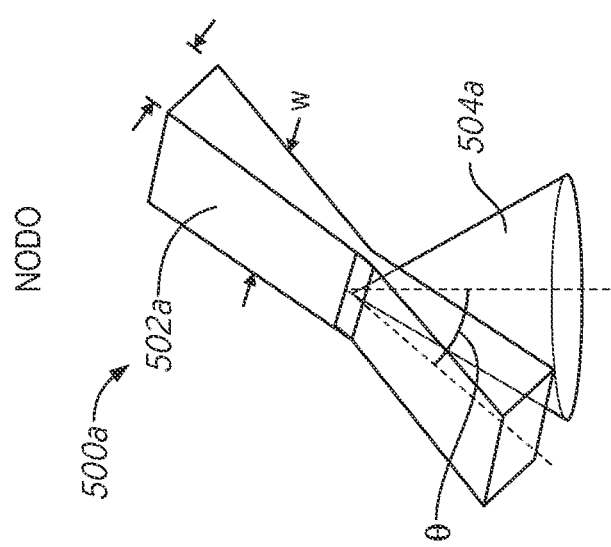

FIGS. 5A-5B are schematic diagrams of illumination and collected light in a first and second operational mode of an OTLS microscope, respectively. FIGS. 5A and 5B represent a view of the interaction between an illumination light sheet and the light collected by an objective in a NODO mode (FIG. 5A) and in an ODO mode (FIG. 5B). The two views of FIGS. 5A-5B may represent light provided by the same physical microscope but in different operational modes. For example, the views of FIGS. 5A-5B may represent the operation of a hybrid OTLS microscope, such as the one described in FIGS. 3-4. The optical mode 500a represents a NODO mode, while the optical mode 500b represents an ODO mode.

Each of the FIGS. 5A-5B shows a respective illumination light sheet 502a/502b and a respective cone of collected light 504a/504b. The illumination light sheet and collected light interact to produce a field of view (FOV). The illumination light sheet may be adjusted between operating modes in order to accommodate the different geometry of the collected light.

FIG. 5A shows an illumination light sheet 502a and a cone of collected light 504a. The illumination light sheet 502a may have an angle $\theta$ with the collected light 504a. The angle $\theta$ may be a non-orthogonal angle, such as an acute angle, as discussed above with reference to FIGS. 1-4. FIG. 5B shows an illumination light sheet 502b and a cone of collected light 504b. The illumination light sheet 502b may have an angle $\varphi$ with the collected light 504b. The angle $\varphi$ may be approximately orthogonal (e.g., about 90°), as discussed in detail above.

The collected light 504a may be a wider cone than the collected light 504b, since in the NODO mode, the collection objective may be a higher NA than the NA of the collection objective used in the ODO mode. The illumination light sheet 502a may have an increased NA, and a smaller width W compared to the illumination light sheet 502b. Accordingly, the FOV in the optical mode 500a is smaller than the FOV in the optical mode 500b. This may be due to adjustments in the illumination optics. For example, an adjustable beam expander may be used to alter the W and NA of the illumination light sheet between the modes.

Figure 6A:
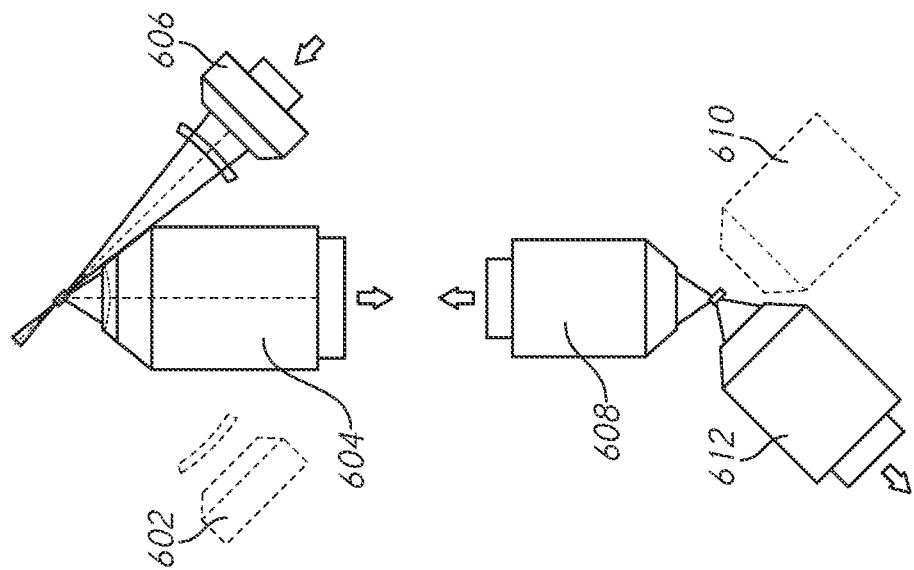
FIGS. 6A-6B show a hybrid OTLS microscope with dual illumination modes according to some embodiments of the present disclosure.
Figure 6B:
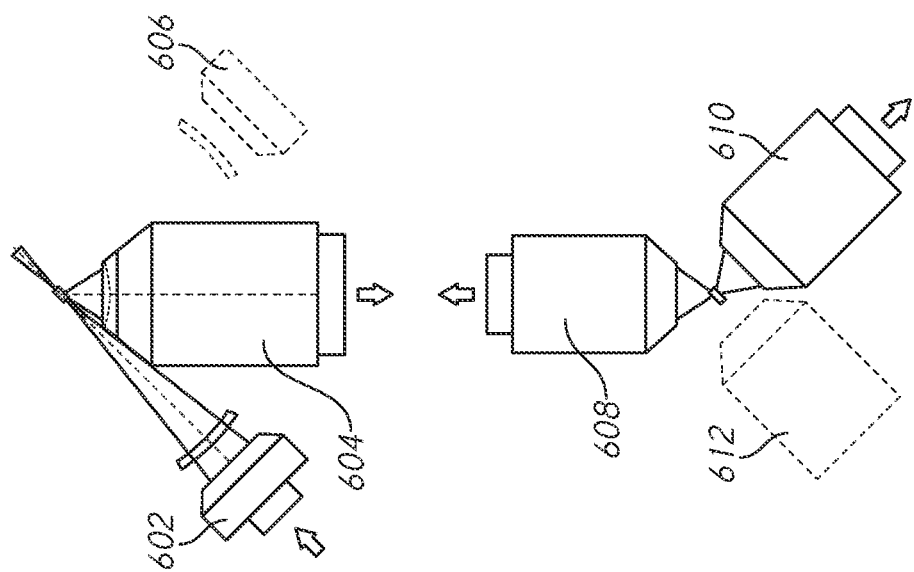

FIGS. 6A-6B show a hybrid OTLS microscope with dual illumination modes according to some embodiments of the present disclosure. The views shown in FIGS. 6A-6B represent portions of a hybrid OTLS microscope with both an ODO mode and a NODO mode. For example, the views of FIGS. 6A-6B may represent portions of the microscope 300 of FIG. 3 in some embodiments. For the sake of brevity, features, components, and operations previously described with respect to one or more previous figures will not be repeated with respect to FIGS. 6A-6B.

FIGS. 6A-6B show an additional imaging mode which may be used to take advantage of the three objectives (e.g., the illumination objective, the NODO collection objective, and the ODO collection objective) which can direct and receive light from the sample. Rather than provide illumination for the NODO path through a single illumination objective, the system may also be configured into a mode where illumination can be provided through the ODO collection objective. FIG. 6A shows a microscope operating in a first mode where illumination light is being provided by a first objective 602 and received by a collection objective 604 at a non-orthogonal angle. FIG. 6B shows the same microscope operating in a second mode where illumination light is being provided by a second objective 606 and received by the collection objective 604 at a non-orthogonal angle. In some embodiments, images taken using both modes may be combined, for example, to improve the imaging performance compared to a single image.

The microscope of FIGS. 6A-6B includes a first objective 602, a second objective 606, and a third, collection, objective 604. Light collected by the collection objective 604 may be passed through one or more transfer optics (not shown) to optics which may reorient the collected image. Since there are two illumination paths, each with a different angle with respect to the collection objective 604 (e.g., +45° and −45°), the reorientation optics may need to correct for two different angles. The example microscope of FIGS. 6A-6B includes a remote image system. The remote image system includes a fourth objective 608, a fifth objective 610, and a sixth objective 612. The fourth objective 608 may generate a remote image, which may imaged by either the fifth objective 610 or the sixth objective 612 depending on the imaging mode.

In an ODO imaging mode (not shown in FIGS. 6A-6B) illumination may pass between the objectives 602 and 606. For example, the objective 602 may act as an illumination objective and provide an illumination light sheet to the sample, and the objective 606 may image the sample at a roughly orthogonal angle to the illumination light sheet. The opposite arrangement may also be used, where the objective 606 provides the illumination light sheet, and the objective 602 collects at a roughly orthogonal angle.

In some embodiments, various optical components along the illumination path may be shared between the modes represented in FIGS. 6A and 6B. For example, there may be a single light source which may be coupled to either of the two objectives 602 or 606 depending on the mode. Similarly, there may be shared components in the collection path as well. For example, one or more detectors may be coupled to the objectives 602, 604 or 606 depending on which imaging mode is being used.

In a NODO imaging mode, depending on which objective 602 or 606 is used to provide the illumination light sheet, the light sheet may have a different angle with respect to the collected light. For example, if the angle between axis of the objective 602 and the axis of the objective 604 is 0, then the angle between the axis of the objective 606 and the axis of the objective 604 may be $-(90°-\theta)$. Here, the negative sign indicates that angle is in an opposite direction (relative to the axis of the objective 604) than the angle $\theta$. In some embodiments, the angle $\theta$ may be about 45°, and the two objectives 602 and 606 may have axes which are each about 45° from the axis of the collection objective 604 (but in opposite directions).

To account for the different angles and/or directions when different objectives are used for illumination, the remote focus generated by the objective 608 may also be imaged from different angles. For example, in the imaging mode of FIG. 6A when the objective 602 provides the light sheet, the objective 610 may be used to image the remote focus. In the imaging mode of FIG. 6B when the objective 606 provides the light sheet, the objective 612 may image the remote focus. In some embodiments, these objectives may be coupled to different detectors, or the same detector.

The use of two different viewing modes with different illumination angles may be useful to help correct for distortions due to the angle between the illumination and the collected light (in the NODO mode). For example, a point-spread-function (PSF) of the image may be deconvoluted by combining the two elliptical PSF's of each individual viewing angle. A controller (e.g., 104 of FIG. 1) of the microscope may use various computational techniques to combine the two images. For example, a processor (e.g., 140 of FIG. 1) may execute instructions stored in a memory (e.g., 144 of FIG. 1) to combine information from images collected in the various illumination modes. For example, a fusion deconvolution algorithm may be used.

The microscope of FIGS. 6A-6B is illustrated as using a particular set of reorientation optics, in particular, the remote focus system described in more detail in, for example reorientation optics 230 of FIGS. 2 and/or 340 of FIG. 3. However, other example embodiments which use different viewing modes with different viewing angles may use one or more reorientation optics in addition (or instead of) the remote focus system shown in FIGS. 6A-6B. For example, one of the remote focus systems described in FIGS. 8A-8D may be used instead.

Figure 7:
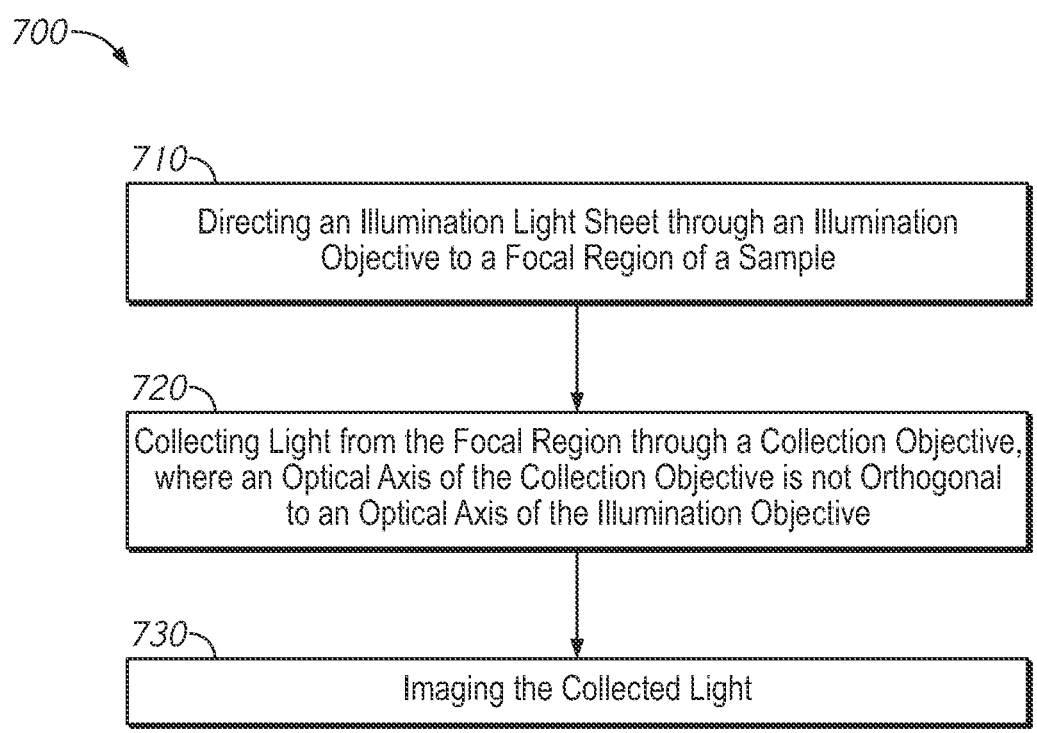
FIG. 7 is a block diagram of a method of illuminating a sample with a microscope according to some embodiments of the present disclosure.

FIG. 7 is a block diagram of a method of illuminating a sample with a microscope according to some embodiments of the present disclosure. The method 700 may generally be performed by one or more of the optical systems described in FIGS. 1-6.

The method 700 may generally begin with block 710, which describes directing an illumination light sheet through an illumination objective to a focal region of a sample. For example, illumination optics (e.g., 120 of FIG. 1) may generate the illumination light sheet and direct it into a back end of the illumination objective. In some embodiments, the properties (e.g., width, NA) of the illumination light sheet may be adjusted based on an operational mode of the microscope. The illumination objective (e.g., 122 of FIG. 1) may direct the illumination light sheet to sample. In some embodiments, the illumination light sheet may pass through the material of the sample holder on its way to the sample. In some embodiments, the illumination light sheet may pass through an immersion fluid between the illumination objective and the sample. In some embodiments, the illumination objective may be an air objective, and the illumination light sheet may pass through a lens or window (e.g., a SIMlens, an SIL) between the illumination objective and the immersion fluid.

Block 710 may generally be followed by block 720, which describes collection light from the focal region through a collection objective, where an optical axis of the collection objective is not-orthogonal to an optical axis of the illumination objective. In some embodiments, the angle between the axes of illumination and collection may be an acute angle, for example a 45° angle. In some embodiments, the angle may be higher or lower (e.g., 10°-80°). In some embodiments, the collection objective may be an immersion objective, and a proximal end of the collection objective may be in contact with the immersion fluid. Accordingly, light may be collected through the sample holder and the immersion fluid into the collection objective.

Block 720 may generally be followed by block 730, which describes imaging the collected light. The light from the collection objective may be directed onto a detector (and/or, an eyepiece) which may be used to present an image to a user.

In some embodiments, the collection optics may direct the collected light to a remote image, and an additional objective may image the remote image at an angle based on the angle between the illumination and collection axes.

In some embodiments, the method 700 may also include imaging the sample through a second collection objective which has a second collection axis which is orthogonal to the illumination axis. The collection objective and second collection objective may be used as part of different imaging modes.

In some embodiments, the previously described embodiments may be combined with a conventional (e.g., orthogonal) open-top light-sheet microscope. For example, there may be a non-orthogonal collection objective (e.g., the primary collection objective of FIG. 1) and an orthogonal collection objective, each of which may use the same illumination objective. For example, FIG. 2 shows an illumination objective oriented at 45 deg. relative to the non-orthogonal collection objective, and a second orthogonal collection objective on the opposite side of the non-orthogonal collection objective also oriented at 45 deg. (forming a 90 deg. angle relative to the excitation objective). In this combined multi-modality system, the non-orthogonal and orthogonal collection paths can be treated separately with independent optical paths or combined into a single optical path (FIG. 3). In some embodiments, the combined system provides multi-scale imaging capabilities, wherein the non-orthogonal arrangement provides high-resolution imaging, and the orthogonal arrangement provides low to moderate resolution imaging (FIG. 4).

Figure 8A:
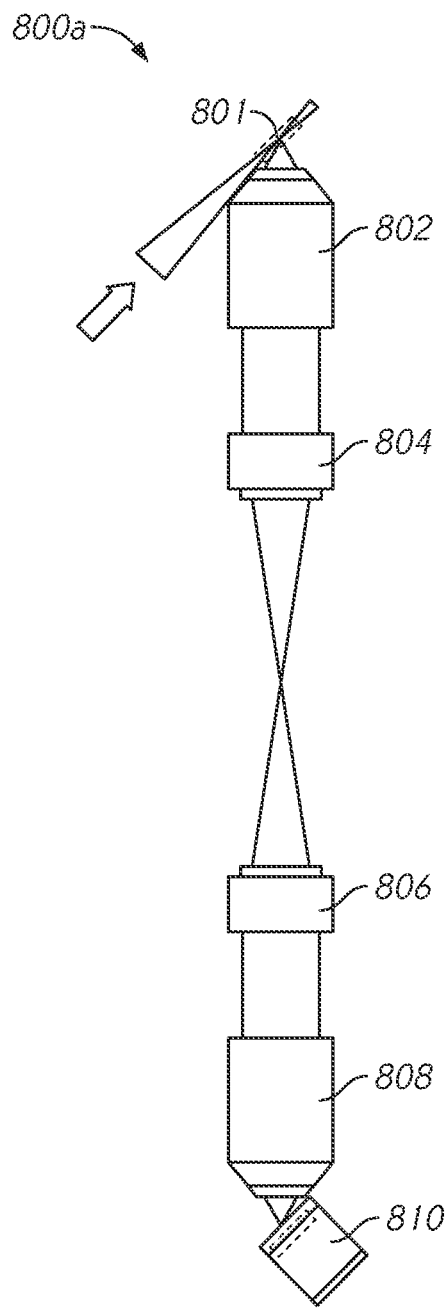
FIGS. 8A-8D are schematic diagrams of different reorientation optics according to some embodiments of the present disclosure.
Figure 8B:
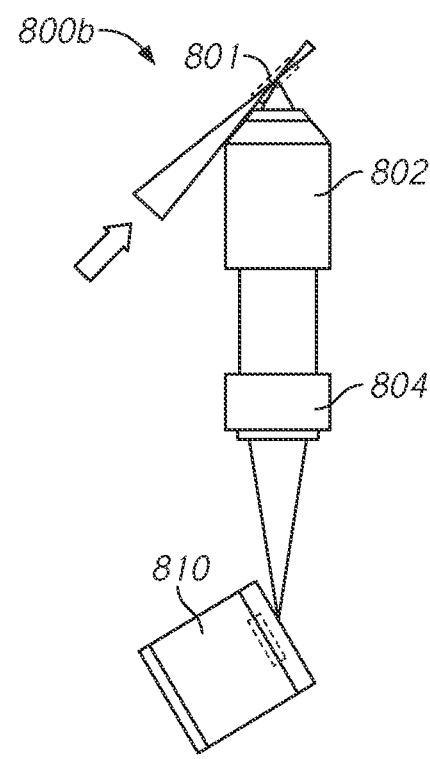
Figure 8C:
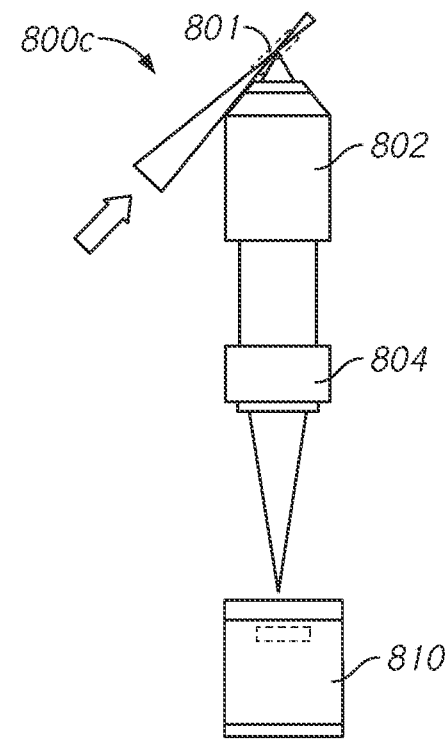
Figure 8D:
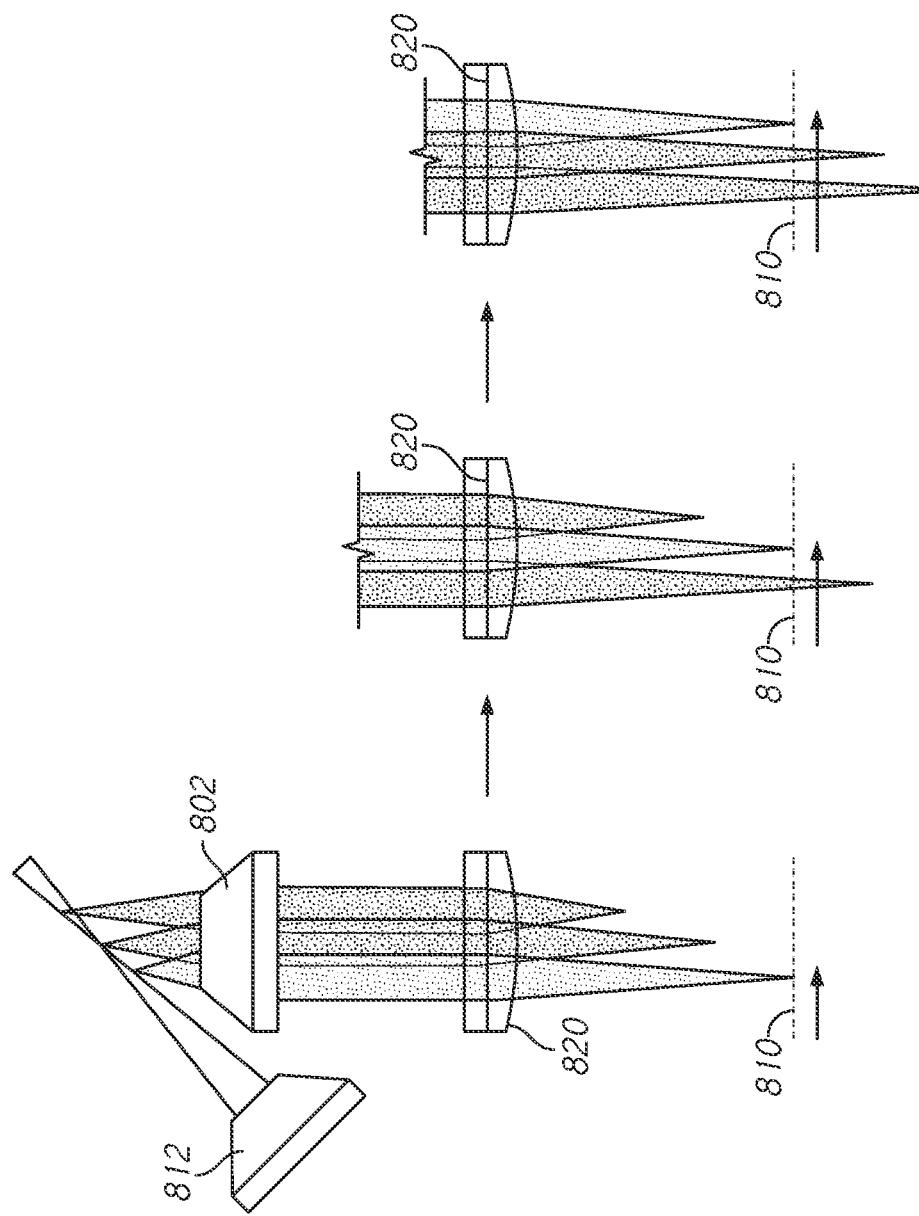

FIGS. 8A-8D are schematic diagrams of different reorientation optics according to some embodiments of the present disclosure. FIGS. 8A-8C are schematic diagrams of reorientation optics which may be used to reorient for the non-orthogonal angle between the illumination and collection axes, while FIG. 8D is a schematic which shows an example operation of the reorientation optics 800c of FIG. 8C in more detail. Any of the reorientation optics of FIGS. 8A-8D may be used in any of the microscopes previously described herein. For example, any of the reorientation optics 800a-800c may, in some embodiments, be included in the reorientation optics 230 of FIGS. 2 and/or 340 of FIG. 3. Since the FIGS. 8A-8D describe many features already described with respect to the previous Figures, for the sake of brevity, some components and features will not be described again.

FIG. 8A shows reorientation optics 800a which uses a detector 810 which is tilted with respect to an optical path of the collected light. A collection objective 802 (e.g., 204 of FIG. 2) collects light at a non-orthogonal angle with respect to an illuminated focal plane 801. Tube lenses 804 and 806 direct the light to an additional collection objective 808, which generates an image of the light onto a detector 810. Unlike the reorientation optics shown in 230 of FIG. 2 and 340 of FIG. 3, the reorientation optics 800a directly project the remote focus onto the detector 810 at an angle, rather than using additional optics to image the remote focus at an angle.

The reorientation optics 800 a may offer certain advantages. For example, the remote focus should ideally be roughly equal to the refractive index of the specimen which is in the range of 1.33-1.56. Therefore, the image plane at the remote focus is roughly the same size as the image plane in the specimen. For higher resolution imaging, the size of the image plane is usually on the order of 0.5-1.0 mm, meaning that the detector would need to be this same size, with very small pixels to provide Nyquist sampling. One potential advantage of placing the tilted detector here, rather than at the intermediate image plane, is that the image plane remains at 45 deg. and is not more tilted.

FIG. 8B shows reorientation optics 800b in which the second tube lens 806 and objective 808 are omitted, and instead the tube lens 804 directly images onto a detector 810 which is at an angle with respect to the optical axis of the tube lens 804 (and objective 802). The tube lens 804 may provide Nyquist sampling of the focal region 801 within the sample. There may be a magnification to this image plane in the range of about 10. This change in magnification will make the angled image plane even more angled at the detector, which may be unideal. However this may be mitigated by using a detector with a particularly small pixel size.

FIGS. 8C and 8D show reorientation optics 800c where a tunable lens 804 is used to vary the focus of the tilted image of the focal region 801 onto a detector 810 which is not tilted with respect to the optical axis of the collected light. The use of a tunable lens 804 may allow for the image to reoriented by synchronizing the tuning of the lens to the operation of the detector 810 (e.g., to the rolling shutter of the camera 810). FIG. 8D shows a schematic which illustrates an example operation where the tunable lens 820 (e.g., tunable lens 804 of the optics 800c) is used to vary which portion of the tilted focal light is in focus on the detector 810, as the detectors rolling shutter moves across the surface of the detector 810.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
    an illumination objective configured to direct an illumination light sheet along an illumination axis into a sample; and
    a collection objective configured to receive light from an imaging plane of the sample along a collection axis,
    wherein the illumination axis and the collection axis are non-orthogonal to each other, wherein a quality of an image collected by the collection objective is diffraction limited, with a Strehl ratio greater than approximately 0.8.

2. The apparatus of claim 1, further comprising a second collection objective configured to receive light from the imaging plane of the sample along a second collection axis, wherein the second collection axis is approximately orthogonal to the illumination axis.

3. The apparatus of claim 2, further comprising illumination optics configured to generate the illumination light sheet, wherein the illumination optics are adjustable between settings based on the collection objective and the second collection objective.

4. The apparatus of claim 2, wherein the collection objective has a first numerical aperture (NA) and wherein the second collection objective has a second NA which is lower than the first NA.

5. The apparatus of claim 1, further comprising: a third objective lens configured to receive light from the collection objective and generate a remote image; and a fourth objective lens configured to image the remote image at an angle based on the non-orthogonal angle between the illumination axis and the collection axis.

6. The apparatus of claim 1 further comprising an immersion fluid, wherein the illumination objective is not in contact with the immersion fluid, and wherein at least a portion of the collection objective is in contact with the immersion fluid.

7. The apparatus of claim 6, further comprising a sample holder configured to support the sample, wherein at least a portion of the sample holder is in contact with the immersion fluid.

8. The apparatus of claim 6, further comprising a lens positioned between the illumination objective and the immersion fluid.

9. The apparatus of claim 8, wherein the lens is a solid immersion lens (SIL) a solid immersion meniscus lens (SIMlens).

10. The apparatus of claim 1, further comprising a sample holder having a first side configured to support the sample and a second side opposite the first side, wherein the illumination objective and the collection objective are positioned below the second side.

11. The apparatus of claim 1, wherein the collection objective has a depth of focus for a given field of view, and wherein the illumination axis is oriented so that it does not stay within the depth of focus of the collection objective.

12. An apparatus comprising:
a sample holder comprising a first surface and a second surface opposite the first surface, wherein the first surface is configured to support a sample;
an immersion chamber configured to hold an immersion fluid;
an illumination objective configured to direct an illumination light sheet towards the sample at an angle which is non-orthogonal to the first surface of the sample holder, the immersion chamber positioned between the illumination objective and the second surface of the sample holder such that the illumination objective directs the illumination light sheet through an ambient medium, through the immersion fluid, and through a material of the sample holder to a focal region of the sample; and
a collection objective configured to collect light along a collection axis which is approximately orthogonal to the first surface, the light having been having passed through the material of the sample holder and the immersion fluid.

13. The apparatus of claim 12, wherein the illumination objective and the collection objective are positioned below the second surface.

14. The apparatus of claim 12, further comprising a second collection objective configured to collect light along a second collection axis which is approximately orthogonal to the illumination light sheet.

15. The apparatus of claim 12, wherein the collection axis forms an acute angle with the illumination light sheet.

16. The apparatus of claim 15, wherein the acute angle is between about 40° and 70°.

17. The apparatus of claim 12, further comprising a solid immersion lens (SIL), and wherein the illumination objective is configured to direct the illumination light sheet through the SIL and into the immersion fluid.

18. The apparatus of claim 12, further comprising a solid immersion meniscus lens (SIMlens), and wherein the illumination objective is configured to direct the illumination light sheet through the SIMlens and into the immersion fluid.

19. The apparatus of claim 12, wherein at least a portion of the collection objective is positioned in the immersion fluid, and the illumination objective is not in contact with the immersion fluid.

20. A method comprising:
directing an illumination light sheet through an illumination objective to a focal region of a sample;
collecting light from the focal region through a collection objective,
wherein an optical axis of the collection objective is non-orthogonal to an optical axis of the illumination objective; and
imaging the collected light, wherein a quality of an image collected by the collection objective is diffraction limited, with a Strehl ratio greater than approximately 0.8.

21. The method of claim 20 further comprising:
collecting light from the focal region through a second collection objective, wherein an optical axis of the second collection objective is approximately orthogonal to the optical axis of the illumination objective; and
imaging the collected light from the second collection objective.

22. The method of claim 21, wherein collecting the light through the collection objective is part of a first operational mode and collecting the light through the second collection objective is part of a second operational mode, the method further comprising adjusting one or more properties of the illumination light sheet between the first operational mode and the second operational mode.

23. The method of claim 20, further comprising:
generating a remote image based on the collected light; and
imaging the remote image at an angle based on the non-orthogonal angle between the optical axis of the collection objective and the optical axis of the illumination objective.

24. The method of claim 20, further comprising:
passing the illumination light sheet from the illumination objective through an ambient medium, through an immersion fluid and through a material of a sample holder to the focal region of the sample; and
collecting light through the material of the sample holder and through the immersion fluid to the collection objective.

25. A method, comprising:
directing an illumination light sheet through an illumination objective to a focal region of a sample, wherein the directing the illumination light sheet includes passing the illumination light sheet from the illumination objective through an ambient medium, through an immersion fluid and through a material of a sample holder to the focal region of the sample;
collecting the light from the focal region through a collection objective, wherein the collecting light from the focal region includes collecting light through the material of the sample holder and through the immersion fluid to the collection objective, wherein an optical axis of the collection objection is non-orthogonal to an optical axis of the illumination objective; and
imaging the collected light.

26. The method of claim 25, further comprising:
collecting light from the focal region through a second collection objective, wherein an optical axis of the second collection objective is approximately orthogonal to the optical axis of the illumination objective; and
imaging the collected light from the second collection objective.

27. The method of claim 26, wherein collecting the light through the collection objective is part of a first operational mode and collecting the light through the second collection objective is part of a second operational mode, the method further comprising adjusting one or more properties of the illumination light sheet between the first operational mode and the second operational mode.

28. The method of claim 25, further comprising:
generating a remote image based on the collected light; and
imaging the remote image at an angle based on the non-orthogonal angle between the optical axis of the collection objective and the optical axis of the illumination objective.

29. An apparatus comprising:
an illumination objective configured to direct an illumination light sheet along an illumination axis into a sample; and
a collection objective configured to receive light from an imaging plane of the sample along a collection axis, wherein the illumination axis and the collection axis are non-orthogonal to each other;

a third objective lens configured to receive light from the collection objective and generate a remote image; and a fourth objective lens configured to image the remote image at an angle based on the non-orthogonal angle between the illumination axis and the collection axis.

30. The apparatus of claim 29 further comprising an immersion fluid, wherein the illumination objective is not in contact with the immersion fluid, and wherein at least a portion of the collection objective is in contact with the immersion fluid.

31. The apparatus of claim 30, further comprising a sample holder configured to support the sample, wherein at least a portion of the sample holder is in contact with the immersion fluid.

32. The apparatus of claim 30, further comprising a lens positioned between the illumination objective and the immersion fluid.

33. An apparatus comprising:
   an illumination objective configured to direct an illumination light sheet along an illumination axis into a sample; and
   a collection objective configured to receive light from an imaging plane of the sample along a collection axis, wherein the illumination axis and the collection axis are non-orthogonal to each other, wherein the collection objective has a depth of focus for a given field of view, and wherein the illumination axis is oriented so that it does not stay within the depth of focus of the collection objective.

34. The apparatus of claim 33, further comprising a second collection objective configured to receive light from the imaging plane of the sample along a second collection axis, wherein the second collection axis is approximately orthogonal to the illumination axis.

35. The apparatus of claim 34, further comprising illumination optics configured to generate the illumination light sheet, wherein the illumination optics are adjustable between settings based on the collection objective and the second collection objective.

36. The apparatus of claim 34, wherein the collection objective has a first numerical aperture (NA) and wherein the second collection objective has a second NA which is lower than the first NA.

* * * * *